(12) United States Patent
Kriese et al.

(10) Patent No.: US 7,918,490 B2
(45) Date of Patent: Apr. 5, 2011

(54) DRIVE DEVICE FOR MOVING A COVERING ELEMENT, DOOR MODULE AND METHOD FOR ASSEMBLING THE DRIVE DEVICE

(75) Inventors: Olaf Kriese, Coburg (DE); Werner Stammberger, Grub am Forst (DE); Christian Bätz, Meeder (DE); Arnd Herwig, Baunach (DE); Sebastian Höhn, Neustadt (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 85 days.

(21) Appl. No.: 12/225,601

(22) PCT Filed: Sep. 28, 2007

(86) PCT No.: PCT/EP2007/060337
§ 371 (c)(1),
(2), (4) Date: Nov. 25, 2008

(87) PCT Pub. No.: WO2008/037803
PCT Pub. Date: Apr. 3, 2008

(65) Prior Publication Data
US 2009/0133844 A1 May 28, 2009

(30) Foreign Application Priority Data
Sep. 29, 2006 (DE) .......................... 10 2006 047 348

(51) Int. Cl.
*B60J 3/00* (2006.01)
(52) U.S. Cl. ...................... 296/97.4; 296/97.8; 296/219
(58) Field of Classification Search ............... 296/37.16, 296/97.8, 97.1, 97.4, 97.9, 219, 223; 160/370.22
See application file for complete search history.

(56) References Cited

U.S. PATENT DOCUMENTS

| | | | |
|---|---|---|---|
| 4,836,263 A | 6/1989 | Ament | |
| 4,850,084 A | 7/1989 | Iwasaki | |
| 6,910,518 B2 * | 6/2005 | Zimmermann et al. | 160/370.22 |
| 7,503,374 B2 * | 3/2009 | Takeuchi et al. | 160/370.22 |
| 2001/0022218 A1 * | 9/2001 | Schlecht et al. | 160/370.22 |

FOREIGN PATENT DOCUMENTS

| | | |
|---|---|---|
| DE | 34 15 930 A1 | 10/1985 |
| DE | 201 12 948 U1 | 11/2001 |

(Continued)

OTHER PUBLICATIONS

English translation of International Preliminary Report on Patentability dated May 14, 2009 for corresponding PCT Application No. PCT/EP2007/060337.
International Search Report, dated Jan. 29, 2008, corresponding to PCT/EP2007/060337.

(Continued)

*Primary Examiner* — Joseph D Pape
(74) *Attorney, Agent, or Firm* — Christie, Parker & Hale, LLP

(57) ABSTRACT

A drive device for moving a covering element for covering an opening in a motor vehicle such as a roller blind, a baggage space cover or a sunroof cover, includes a drive, a guide device and a thrust element which is coupled to the drive. The thrust element is guided in the guide device and is connectable to the covering element in order to move the covering element. The drive for driving the thrust element is coupled to the thrust element via a transmission device being subjected to tensile stress, wherein the transmission device extends at least in certain sections in the guide device.

18 Claims, 29 Drawing Sheets

FOREIGN PATENT DOCUMENTS

| | | |
|---|---|---|
| DE | 102 16 186 A1 | 10/2003 |
| DE | 20 2004 014 652 U1 | 4/2006 |
| EP | 0 240 747 A2 | 10/1987 |
| EP | 1 123 824 A2 | 8/2001 |

OTHER PUBLICATIONS

Chinese examination report dated Sep. 7, 2010 for Application No. 200780015793.2, 13 sheets.

* cited by examiner

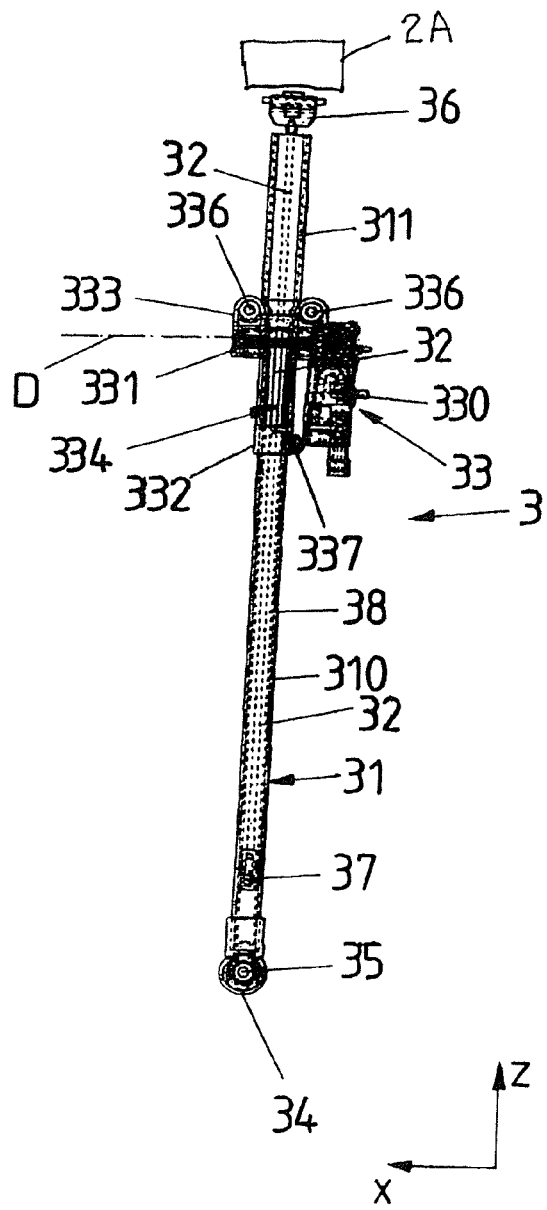
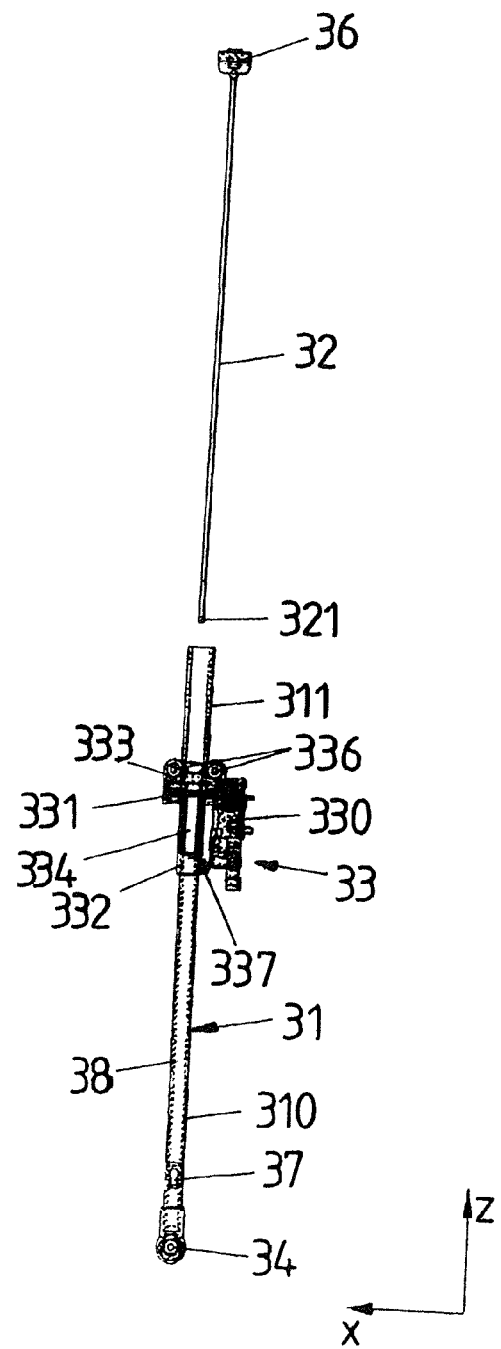

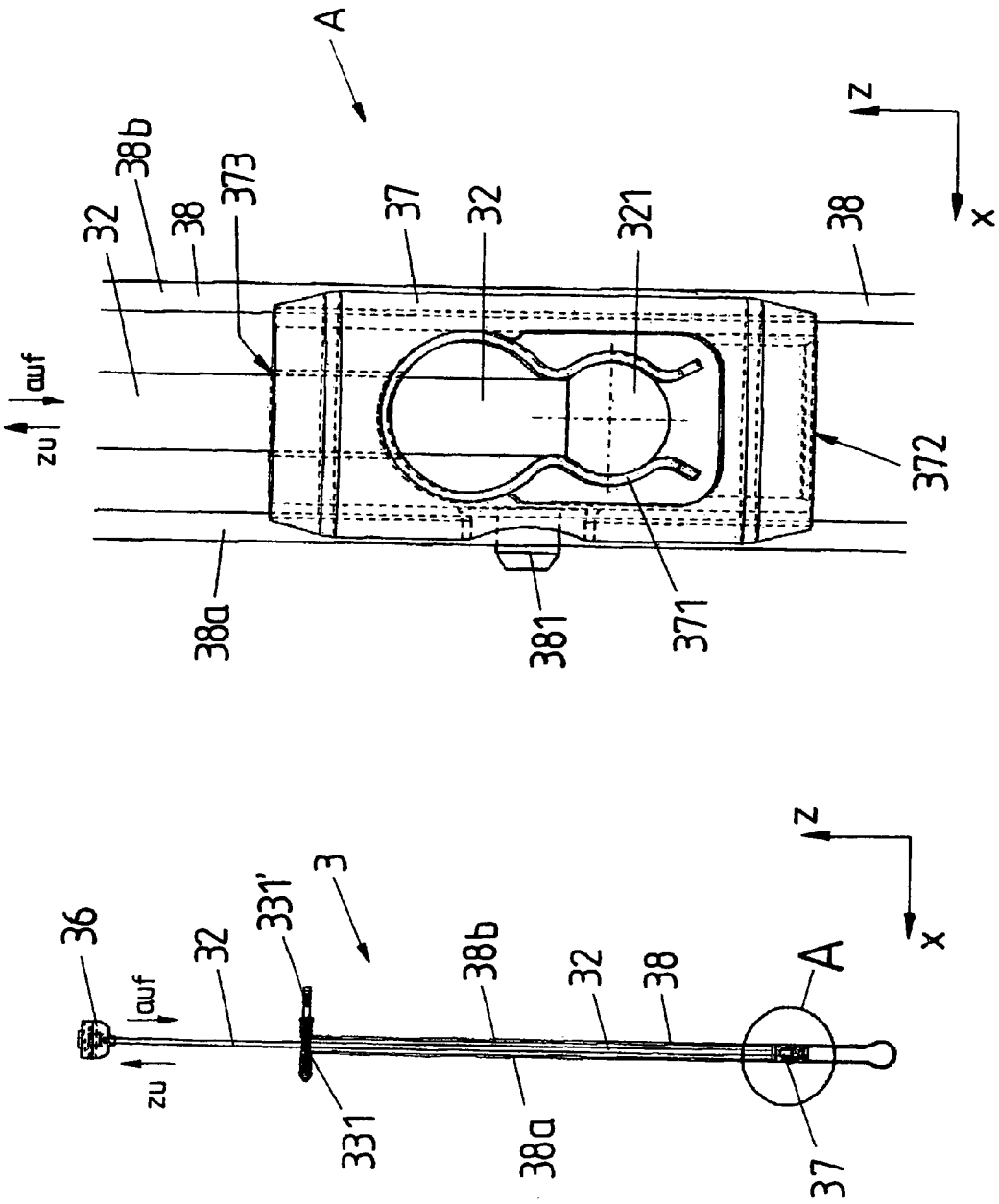

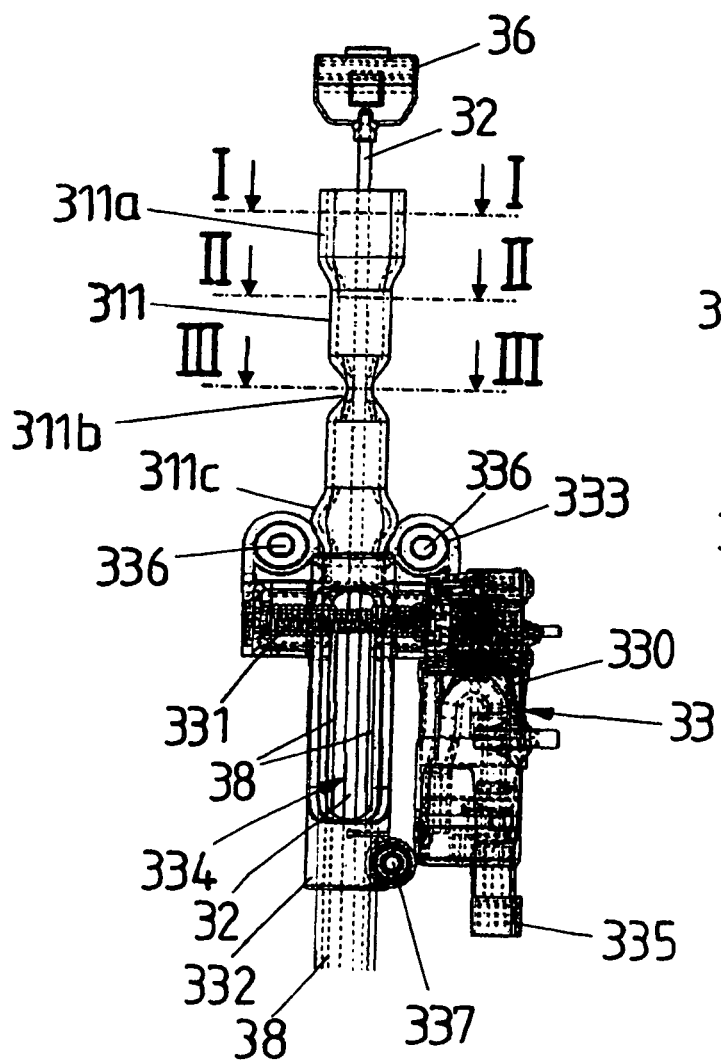
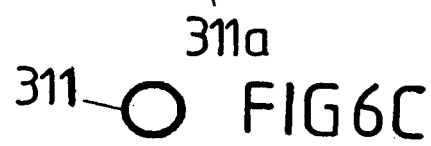
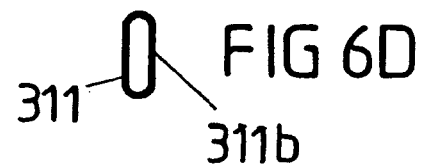

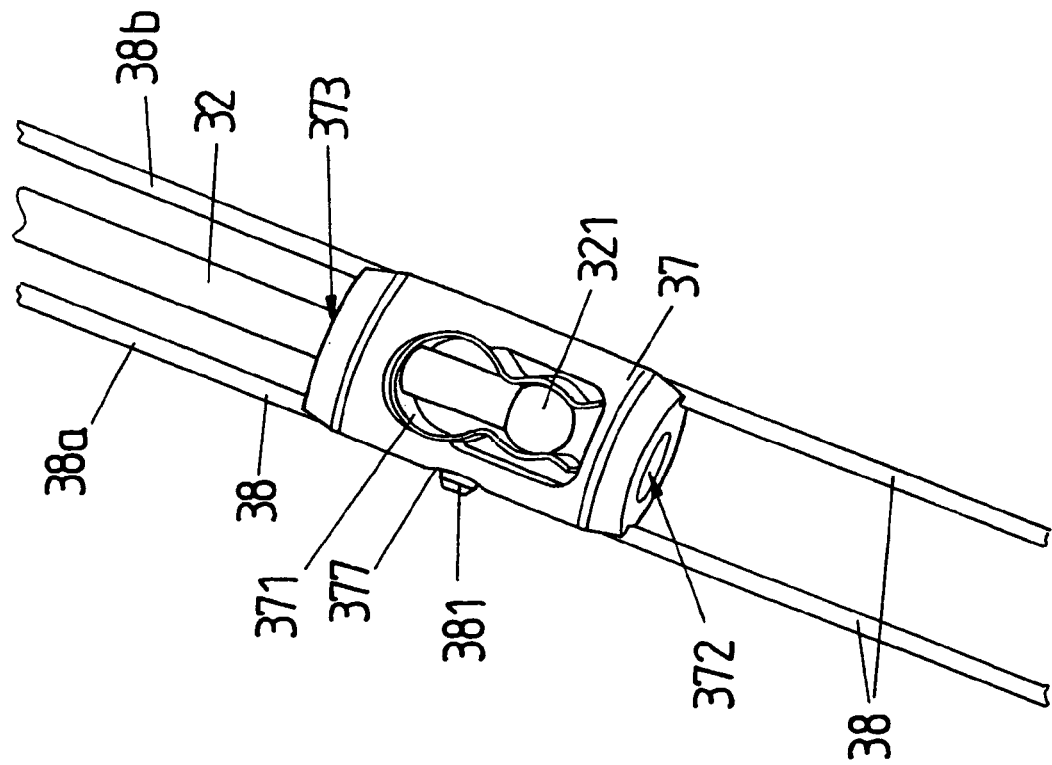
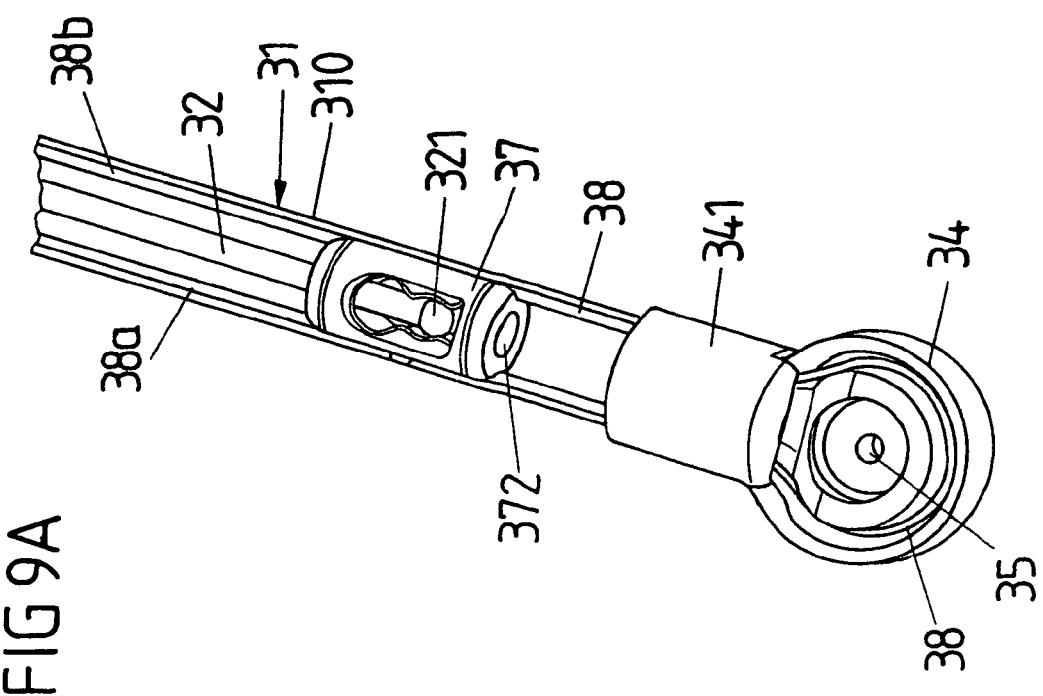

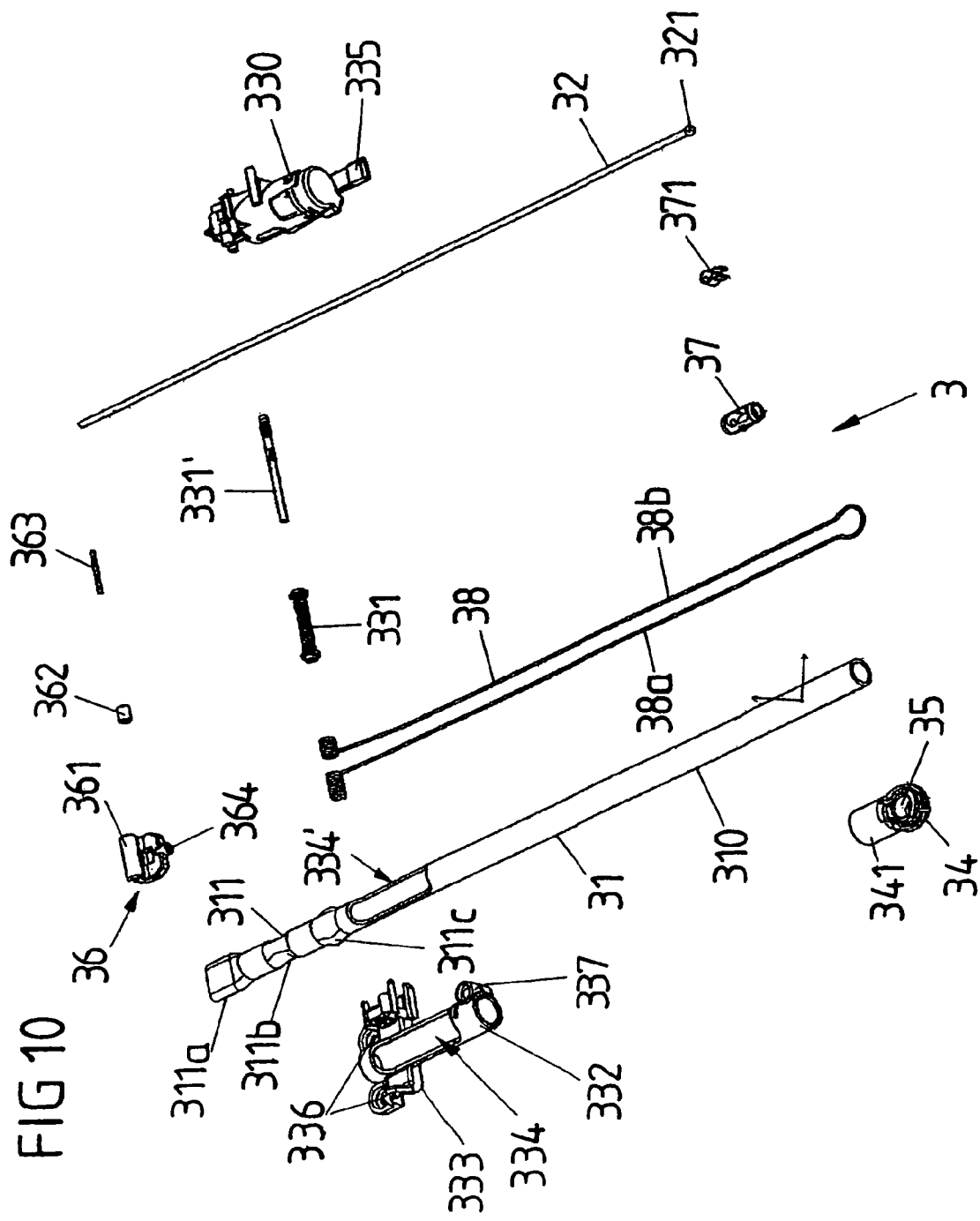

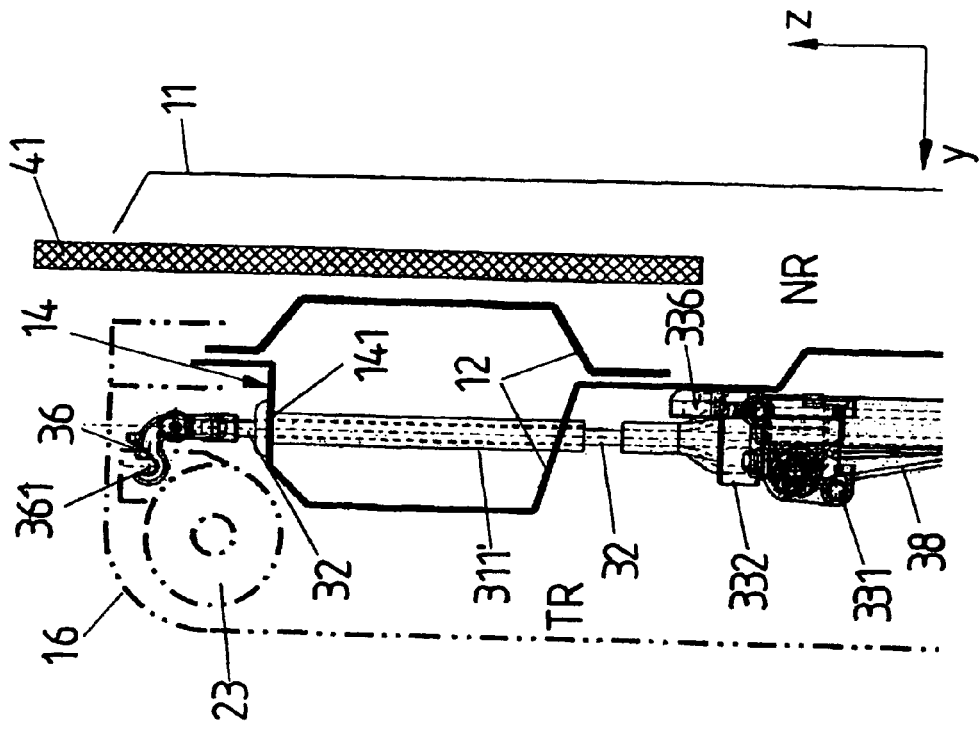
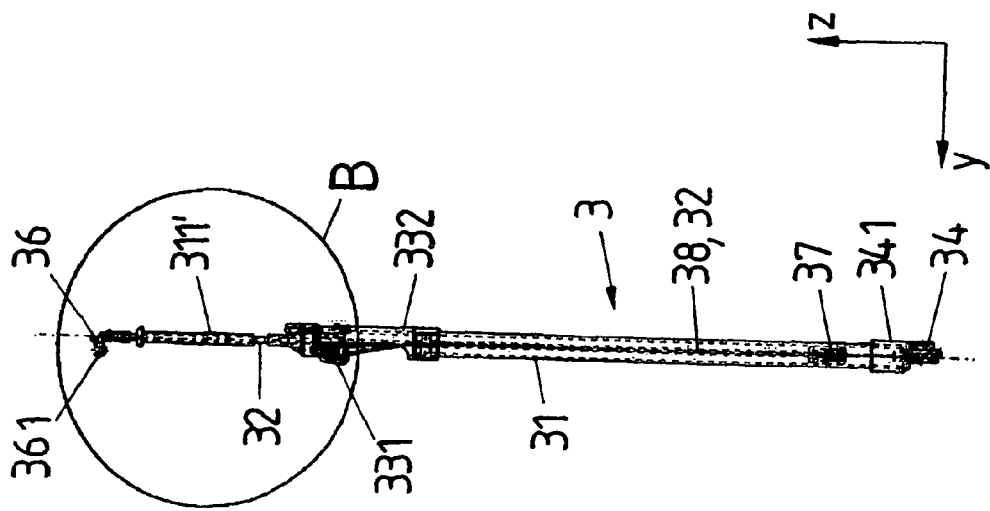

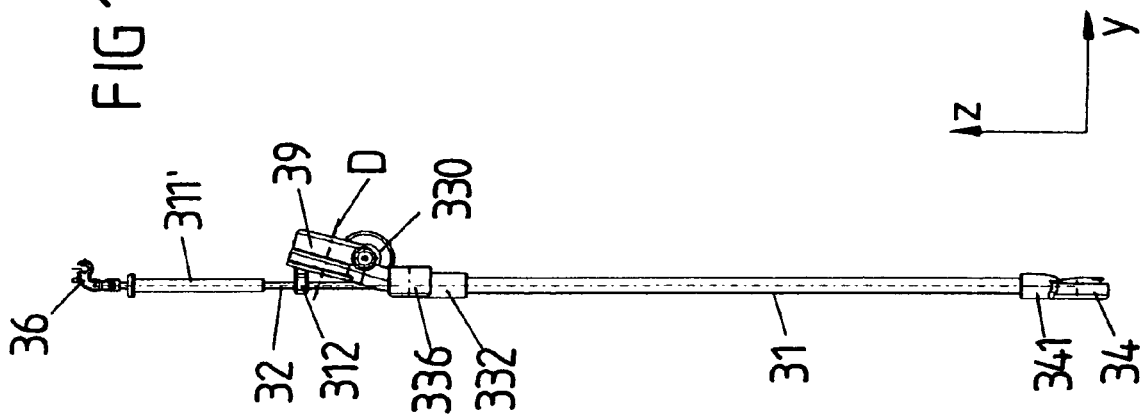
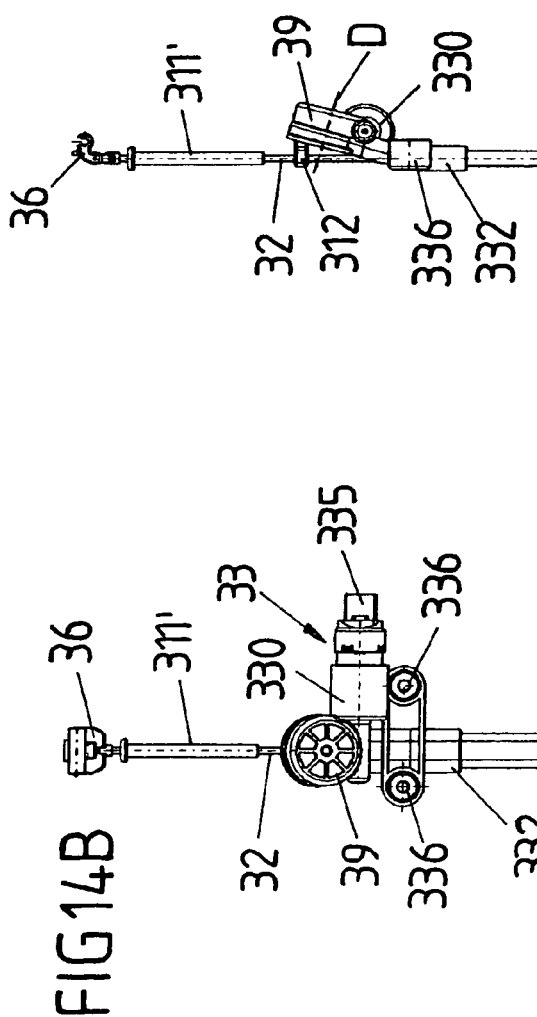

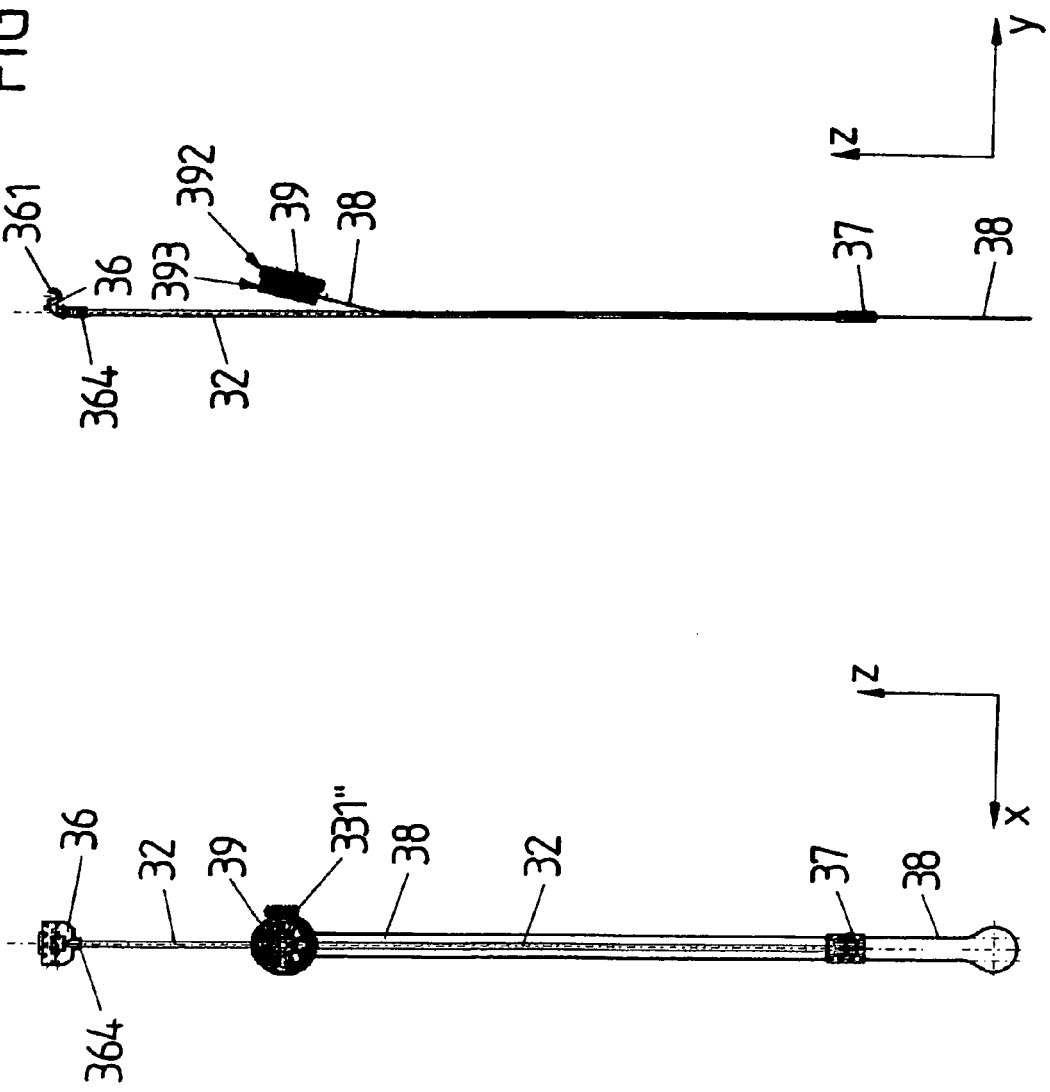

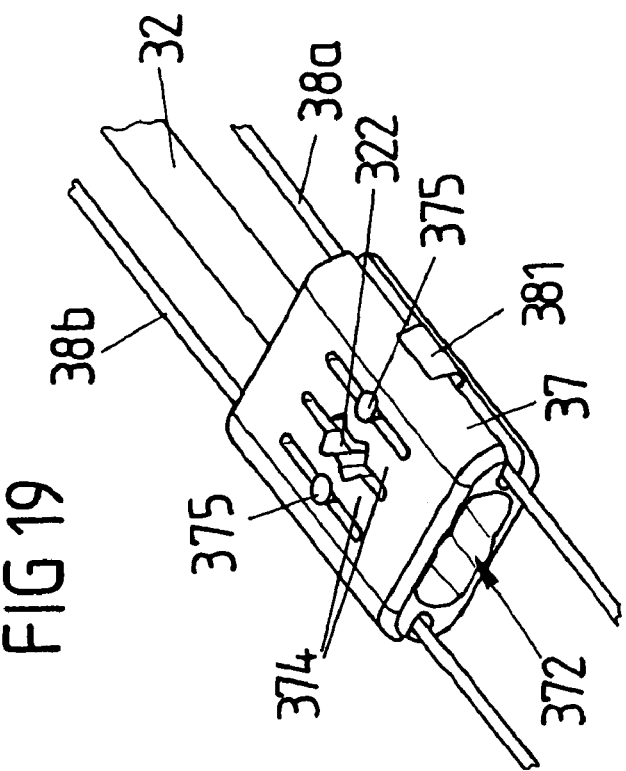
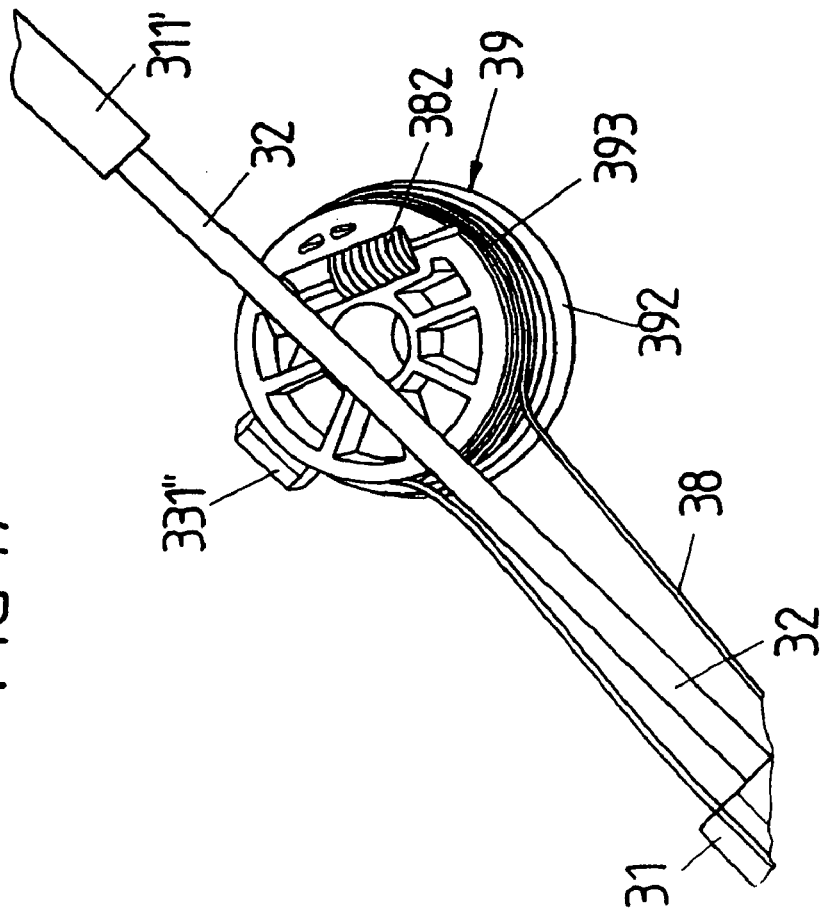

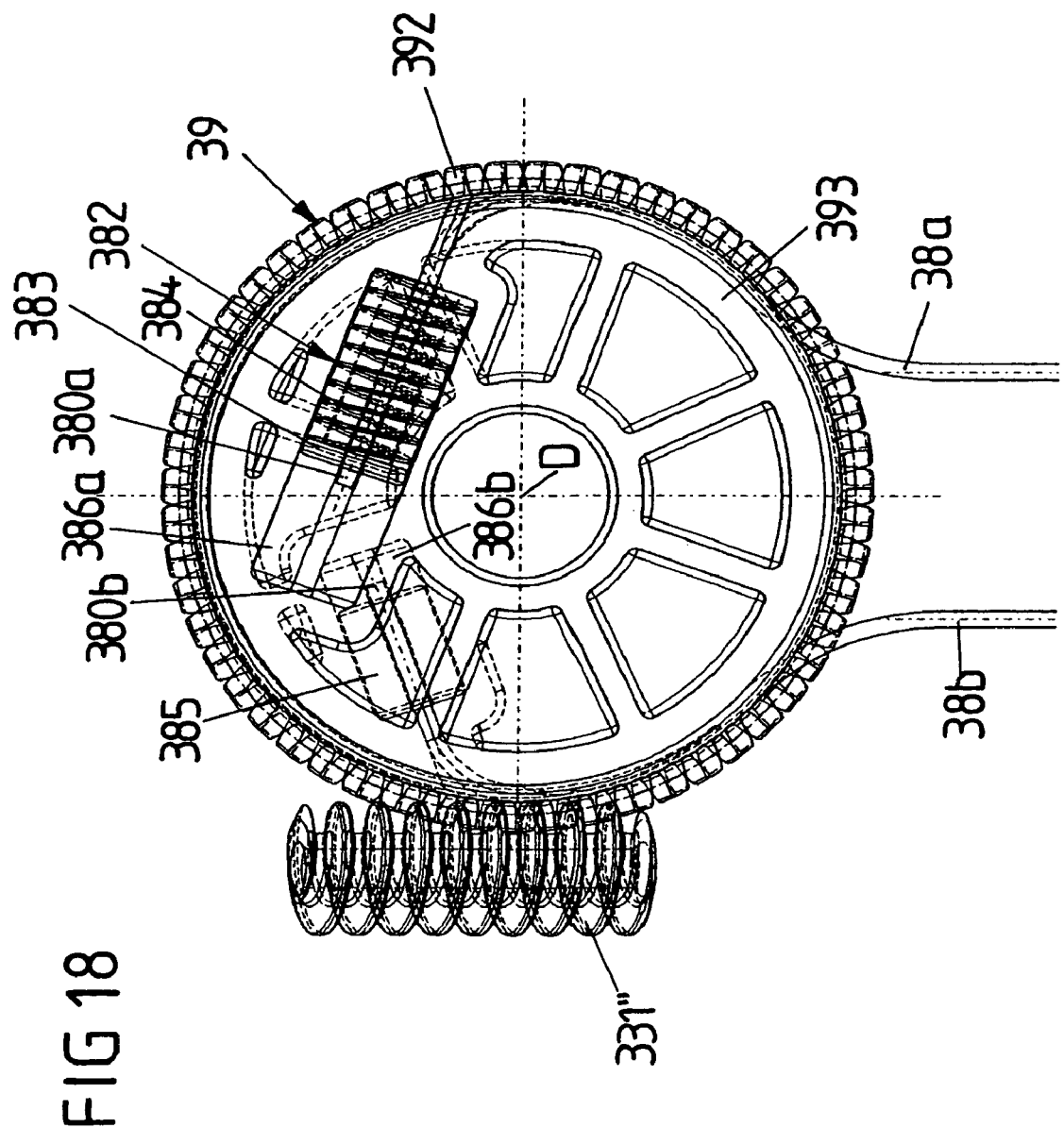

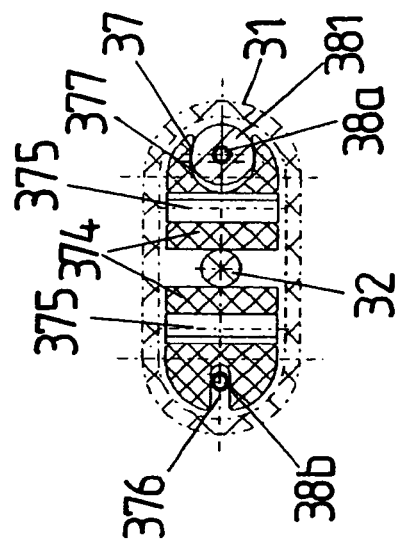
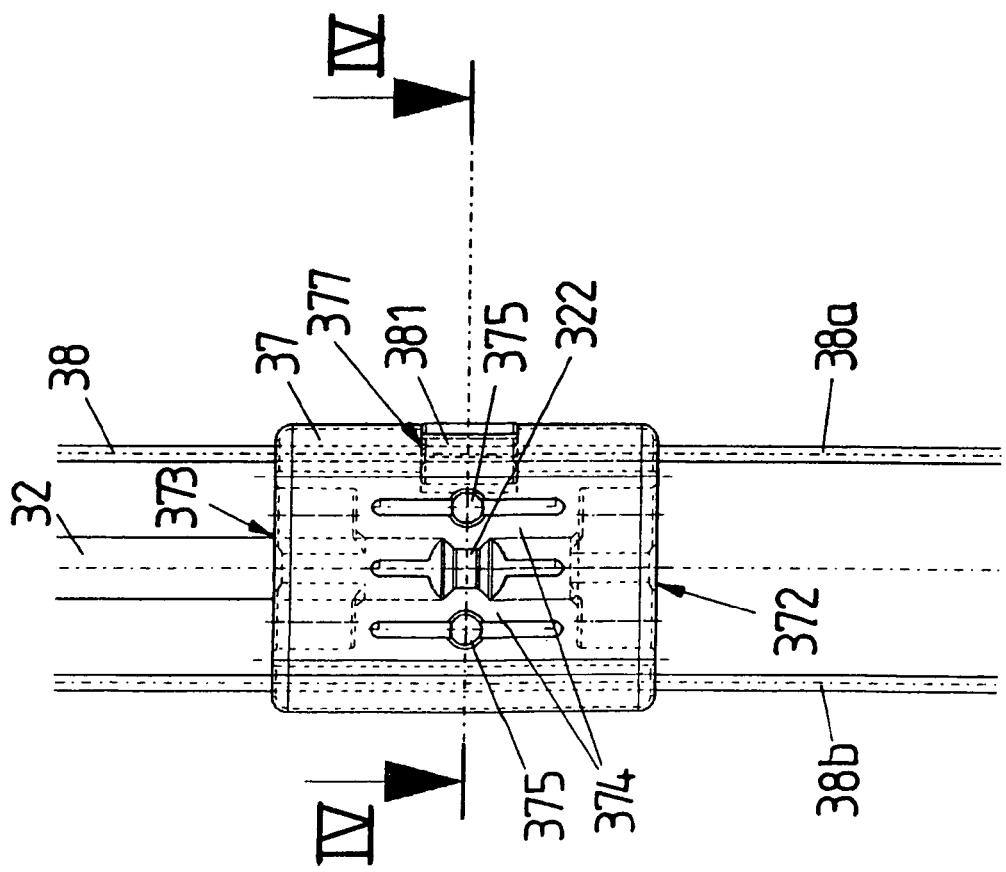
FIG 20B
FIG 20A

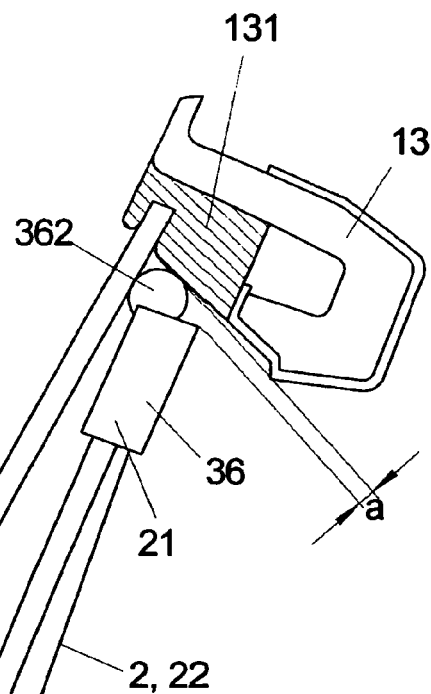
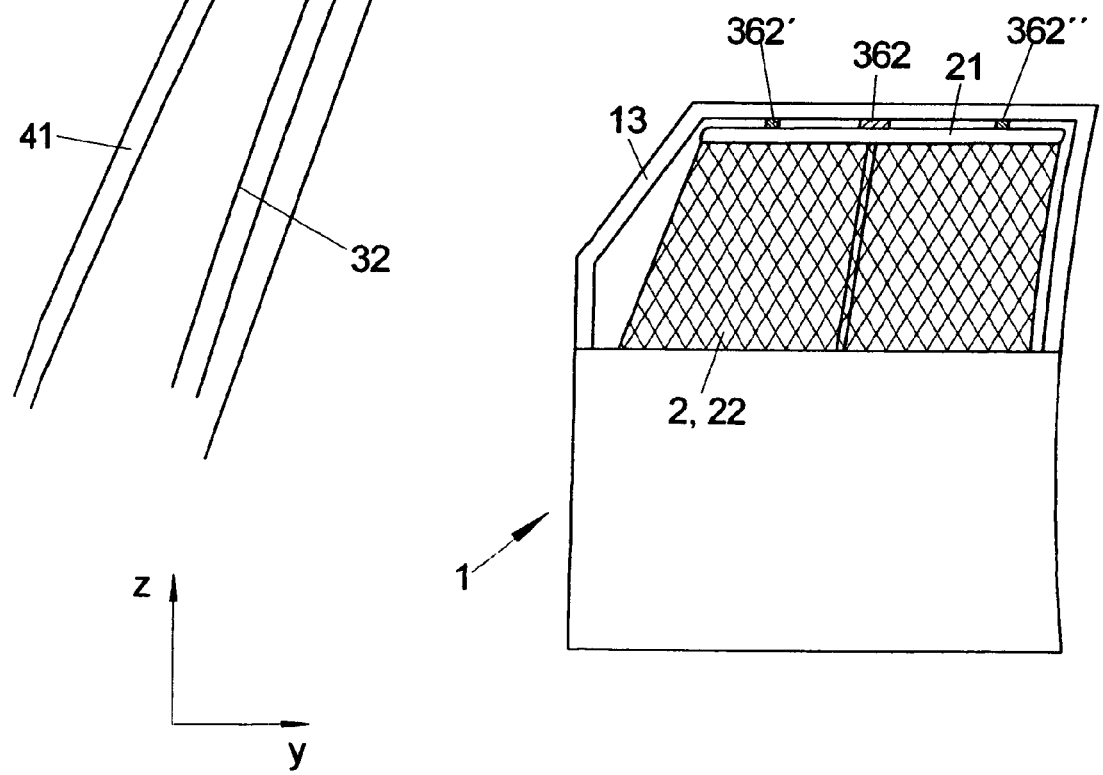

DRIVE DEVICE FOR MOVING A COVERING ELEMENT, DOOR MODULE AND METHOD FOR ASSEMBLING THE DRIVE DEVICE

CROSS-REFERENCE TO A RELATED APPLICATION

This application is a National Phase Patent Application of International Patent Application Number PCT/EP2007/060337, filed on Sep. 28, 2007, which claims priority of German Patent Application Number 10 2006 047 348.5, filed on Sep. 29, 2006.

BACKGROUND

The invention relates to a drive device for moving a covering element for covering an opening in a motor vehicle, in particular a roller blind, a baggage space cover or a sunroof cover and to a door assembly and a method for mounting a drive device.

Such a drive device is used, in particular, for moving a covering element in the form of a roller blind for covering a window opening in a motor vehicle door, and for this purpose it has a drive, a guide means and a thrust element which is coupled to the drive and which is guided in the guide means and can be connected to the covering element in order to move the covering element.

EP 1 123 824 A2 discloses a side window roller blind for motor vehicles which makes use of such a drive device. The drive device according to EP 1 123 824 A2 has a guide means in the form of two guide rails which are arranged vertically on a vehicle door and along which a carriage is guided, which carriage is connected to an upper, horizontal bar, referred to as the bow, of the roller blind web of the roller blind. The carriage is coupled to a thrust element which has, on its outer circumference, a worm toothing in which a pinion of a drive engages and moves the thrust element in order to activate the roller blind. The roller blind web of the roller blind is wound onto a winding shaft in a door breastwork of the vehicle door and can be guided out of the door breastwork through a horizontal slit in the door breastwork and be pulled into the region of the window opening by means of the thrust element and the carriage in order to cover the window opening. During this operation, the roller blind web is unwound from the winding shaft and in the extended state it covers the window opening in such a way that the incidence of light through the window opening is prevented or at least attenuated, and vehicle occupants are therefore protected against solar radiation.

The drive device according to EP 1 123 824 A2 uses guide rails which extend in the region of the window opening. For reliable operation of the roller blind, two lateral guide rails are necessary, along which the roller blind web of the roller blind is pulled and moved into its position in which it covers the window opening. The lateral guide rails are absolutely necessary here in order to guide and stabilize the upper roller blind edge and the carriages. However, only a small installation space is available for the guide rails, with the result that the installation of the roller blind is notably connected with widening of the frame trim or of an intermediate web in the case of a divided window pane, which entails a reduction in the window pane surface and thus in the viewing range of a vehicle occupant and is associated with a considerable degree of expenditure on mounting in order to attach the guide rails and necessary trim elements. At the same time, the external appearance of the window frame may be adversely affected in esthetic terms by the guide rails which project into the region of the window.

SUMMARY

The object of the present invention is to make available a drive device for moving a covering element for covering an opening in a motor vehicle, in particular a roller blind, a baggage space cover or a sunroof cover, as well as a door assembly having a drive device and a method for mounting a drive device, which permit a compact design of the drive device which has the smallest possible adverse effect on the opening surface to be covered and allow cost effective manufacture and ensure safe and reliable operation of the drive device.

According to an exemplary embodiment of the invention, in a drive device of the generic type there is provision for the drive for driving the thrust element to be coupled to the thrust element via a transmission means, wherein the transmission means extends at least in certain sections in the guide means.

The exemplary embodiment of the invention is based on the basic idea of embodying a drive device for moving a covering element, for example a roller blind, in the manner of a single-strand window lifter mechanism which uses a transmission means which is coupled to a thrust element and is moved in order to drive the thrust element. In order to obtain a design which is as compact as possible, the transmission means is integrated here into the guide means in which the thrust element is guided, therefore requiring no additional installation space.

In the state in which it is mounted on the vehicle, the drive device is connected to the covering element, in which case the connection is produced via the thrust element, and the covering element can be moved in a closing direction in order to close the opening, or in an opening direction, which is opposed to the closing direction, in order to clear the opening in the motor vehicle. The covering element may be, for example, a roller blind which is pushed in front of a window opening in a vehicle door by moving the thrust element in order to cover the window opening, or is removed from the region of the window opening in order to clear the window opening.

The thrust element is exemplary embodied in the form of a pressure-resistant, rod-shaped element and extends essentially parallel to the opening direction and closing direction of the covering element. The transmission means is embodied as a flexible cable in the manner of a single-strand cable window lifter, is connected to the thrust element and produces the connection between the thrust element and the drive. As a result of the drive being activated, the cable which is guided at least in certain sections in the guide means of the drive device is moved, and therefore a force is applied to the thrust element and causes the covering element to be adjusted.

The guide means in which the thrust element is guided is exemplary arranged on the vehicle or part of the vehicle in such a way that the guide means extends essentially outside the opening which is to be covered in the vehicle, and the guide means guides the thrust element, which is coupled to the covering element, into the region of the opening in order to cover the opening. The guide means which serves to guide the thrust element is therefore arranged outside the region of the opening which is to be covered, and it guides the thrust element in such a way that the covering element which is coupled to the thrust element and has the purpose of covering the opening is moved into the region of the opening. In particular, the thrust element which is embodied in the form of a rod can, in this context, be pushed out of the guide means in order to close the opening, in which case the covering element which is coupled to the thrust element is pulled over the opening and the opening is therefore covered. The drive device can in this way be used to move a roller blind and can be arranged on a vehicle door in such a way that the guide means extends essentially in an internal space in the vehicle door and during operation it displaces the thrust element, together with the roller blind, into the region of the window opening in the vehicle door.

The guide means is exemplary embodied as a guide duct or guide pipe which extends in a direction of extent, essentially parallel to the opening direction and closing direction of the covering element, and in which the thrust element which is embodied as a rod is guided. The guide means which extends in the opening direction and closing direction therefore predefines the direction of movement of the covering element by virtue of the fact that it guides the thrust element in the opening direction or closing direction and in this way directs and defines the movement of the covering element.

The guide means is exemplary embodied in such a way that it supports the thrust element transversely with respect to the direction of its extent. In this context it is conceivable and advantageous that the guide means which is embodied in the form of a guide pipe guides the thrust element completely and on all sides in a transverse direction with respect to the direction of extent of the guide means, and forms a closed, tubular guide path. However, it is also conceivable that the guide means in the form of a guide duct supports the thrust element on both sides parallel to a first direction which is perpendicular to the direction of extent, with the result that in this first direction the thrust element is secured relative to the guide means, but parallel to a second direction which is perpendicular to the direction of extent it is supported only on one side, with the result that the thrust element is guided in the guide means only on one side in the second direction. Such a guide means may be embodied, for example, by means of a guide duct which is U-shaped in cross section and which brings about guidance on both sides in the first direction by means of its two limbs, and brings about guidance on only one side in the second direction by means of its base surface.

In order to ensure that the thrust element is securely guided in the guide means which is embodied as a guide duct, the thrust element can be held in the guide means by prestress which is applied to the thrust element and acts parallel to the second direction. In this case, the guidance of the thrust element in the guide means therefore takes place on three sides by virtue of the structural configuration of the guide means, but on the fourth side it takes place by means of a prestressing force which holds the thrust element in the guide means. In one advantageous embodiment, the guide means is integrated into a door module carrier panel or a door inside trim of a vehicle door. In this context, the guide means may be provided integrally as, for example, a guide duct in the door module carrier panel or the door inside trim, therefore forming a guiding means for the thrust element along the door module carrier panel or the door inside trim. Of course it is alternatively possible and advantageous that, within the scope of a modular design of the drive device, the guide means is embodied as a separate unit which is to be arranged on the vehicle and which is attached, for example, to a door inside panel, a door module carrier panel or a door inside trim of the vehicle door.

The thrust element is coupled according to the invention to the transmission means and is driven via the transmission means by means of the drive of the drive device. The thrust element is exemplary connected to the transmission means via a driver, while in one preferred embodiment the thrust element is guided in a first part of the guide means via the driver and is coupled to the driver and is moved by means of the transmission means so as to slide in the guide means. The driver is adapted here in terms of its shape to the guide means in order to ensure safe, low-friction, sliding guidance of the driver in the guide means.

In order to largely optimize the sliding movement of the driver in the guide means, the driver can have at least one elastic element which is embodied in such a way that the driver is guided in a damped fashion in the guide means transversely with respect to the direction of extent of the guide means. The elastic element is embodied here, for example, in the form of springs which are arranged on the driver and which act between the driver and the lateral guide faces of the guide means in order to bring about in this way closely fitting, play-free and rattle-free guidance of the driver in the guide means. If the driver is manufactured from plastic, the elastic elements, for example in the form of springs, can be integrally injection-molded onto the driver by means of the two-component technique. The driver and/or the elastic elements can also be matched in their material to the guide means in order to move the driver in the guide means with as little friction as possible.

The first part of the guide means is exemplary connected at one of its ends to the drive, and at its other end to a deflection means for deflecting the transmission means which are embodied as a cable. The transmission means which is embodied in the manner of a single-strand cable window lifter therefore extends from the drive to the deflection means, is deflected by the deflection means and extends back to the drive. The driver which is coupled to the transmission means is then moved during operation along the first part of the guide means by virtue of the fact that the drive moves the transmission means and in this way pushes the driver between the end which is connected to the drive and the end of the first part of the guide means which is connected to the deflection means.

In one exemplary embodiment, in order to compensate for the lengths, of the transmission means in the direction of extent of the guide means, the deflection means is connected in a spring-elastic fashion to the first part of the guide means. The coupling between the deflection means and the guide means is therefore not of rigid design but rather prestressed in a spring-elastic fashion, with the result that play in the transmission means can be compensated for automatically. The spring-elastic prestress has the effect that, if the transmission means is not tautly stressed between the drive and the deflection means, the deflection means is forced away from the guide means in order in this way to increase the distance between the deflection means and the drive and to stress the transmission means tautly between the drive and the deflection means. At the end which lies opposite the end connected to the deflection means, the first part of the guide means is connected to the drive of the drive device. Starting from the drive, the transmission means exemplary extends into the guide means through a cutout in the guide means, in order to be guided from the drive to the deflection means and back again in the interior of the guide means. A particularly space-saving design is achieved by guiding the transmission means in the guide means and at the same time the transmission means which is embodied, for example, as a cable is protected against effects from the outside and shielded against dirt and moisture. Since the transmission means is directed into the guide means starting from the drive and through a cutout which is arranged in the direct vicinity of the drive, the transmission means extends virtually over its entire length inside the guide means and is therefore largely enveloped and shielded by the guide means.

The transmission means is exemplary permanently connected to the driver via a cable nipple or a materially joined connection, in particular a bonded connection or fused connection. The transmission means is therefore rigidly coupled to the driver, with the result that a movement of the transmission means which is brought about by the drive is transmitted directly into a movement of the driver in the guide means.

In a home position, the driver is exemplary in contact with a stop on the end of the guide means facing the deflection means, wherein the stop defines the home position of the driver. For example, in the home position the driver rests against a stop in the region of the deflection means and is in a position in which the thrust element is moved into the guide means as far as possible, and the covering element which is coupled to the thrust element is in a position of maximum opening. In this context it is also conceivable for the driver to bear against a stop in an end position in which the covering element is arranged in a position which covers the opening in the vehicle to a maximum degree, said stop being arranged, for example, in the region of the drive. Furthermore it is conceivable to provide a kinematically reversed arrangement in which the driver bears against a stop in the region of the deflection means when the covering element is closed, and bears against a stop in the region of the drive when the covering element is opened.

In addition to the stop, it is possible to provide, in the region of the deflection means and/or in the region of the drive, a locking means by means of which the driver is secured transversely with respect to the direction of extent of the guide means, in the home position and/or in the end position. The locking means causes the driver to be held in a rattle-free fashion in the guide means in the home position and/or the end position in order to obtain a defined, secured position of the driver in the guide means in the respective end positions, corresponding to the opened and respectively closed position of the covering element.

In this context it is also conceivable and advantageous to provide a further elastic, for example integrally injection-molded on element on the driver, by means of which element the driver is damped in relation to the stop and/or in relation to the locking means in order to prevent a rattling in the home position or the end position of the driver.

The spring-elastic element which acts in the direction of extent of the guide means between the driver and the guide means prestresses the driver in the home position or the end position with respect to the guide means, and can in this way be held in a rattle-free fashion even when shocks take place.

In a particularly exemplary embodiment, the thrust element is detachably connected to the transmission means. This is advantageous in particular in order to permit easy mounting of the thrust element in the guide means and removal from the guide means.

At the same time, the detachable connection between the thrust element and the transmission means can be configured in such a way that in the case of trapping the connection between the thrust element and the transmission means is automatically released and the trapping of an object by the covering element is therefore prevented. This takes place in particular by virtue of the fact that the thrust element is connected, via a connecting device which is dependent on compressive force, to the driver which is guided in the guide means and coupled to the transmission means.

The connecting device is exemplary embodied in such a way that when there is a compressive force acting in the opening direction of the covering element owing to a case of trapping, the thrust element becomes detached from the driver, with the result that the covering element which is coupled to the thrust element can be moved back into its home position in which the opening to be covered is cleared, in order to clear the opening in the vehicle.

At the same time, there is exemplary provision that the connecting device automatically restores the previously disconnected connection between the driver and the thrust element when the driver which is coupled the transmission means moves into its home position—corresponding to the position when the covering element is opened to a maximum degree. After the connection between the thrust element and the driver has therefore been disconnected when a case of trapping takes place, a case of driver is simply moved back into its home position and in this way the connection between the driver and the thrust element is automatically restored.

In one exemplary embodiment, the connecting device for connecting the thrust element to the driver is formed by a clip element on the thrust element, and a spring-elastic element is formed on the driver. The thrust element is held in the spring-elastic element of the driver by means of the clip element which is arranged on the thrust element, wherein the connection between the thrust element and the driver can be disconnected as a function of force when there is a compressive force in the opening direction applied to the thrust element or there is a tractive force in the closing direction applied to the thrust element. The essential feature in this embodiment of the connecting device is that the connection between the driver and the thrust element can be disconnected on both sides both when a compressive force is applied and when a tractive force is applied. In this way, the connecting device permits the thrust element to be forced out of the driver when a compressive force is applied, and to be pulled out of the driver when a tractive force is applied. The connecting device therefore permits, on the one hand, the provision of a trapping protection by virtue of the fact that the clip element is matched to the thrust element and the spring-elastic element is matched to the driver in a case of trapping, and when a predetermined compressive force is exceeded they are disconnected from one another, and on the other hand dismounting takes place by virtue of the fact that the thrust element can be removed from the driver by applying a tractive force.

In a second part, the guide means is exemplary adapted in terms of its shape to guide the thrust element. In the second part, the guidance of the thrust element is carried out here without a driver, wherein the thrust element interacts directly with the guide means and the thrust element is guided so as to slide in the guide means. The guide means can, for this purpose, be embodied with a taper in certain sections in the second part, wherein, in tapering locations which constitute constrictions, the guide means is adapted to the shape of the thrust element, which is embodied in a rod shape, and in this way the thrust element is guided free of play and free of rattling. By means of the guidance of the thrust element in the second part of the guide means it is also possible to ensure that the thrust element which is embodied for this purpose as, for example, a rod element which is elastic at least in certain sections, but is also pressure-resistant, is prestressed in relation to the first part of the guide means and therefore, in particular in the case of a guide means which is embodied by means of a guide duct which is open on one side, to achieve safe and reliable guidance of the thrust element in the first part of the guide means.

The guide means which is composed of the first part and the second part is exemplary embodied in one piece. The first part and the second part of the guide means are connected to one another and form an integral component in which the thrust element is guided.

Alternatively, the guide means can have a first part and a second part which are embodied as separate components, wherein the first part is connected to the drive and to the deflection means and serves to guide the driver, and the second part is provided as an additional component for shielding the thrust element against dirt and moisture. For example, if the drive device which is for a roller blind of a vehicle door is used, the second part of the guide means extends through a door breastwork and guides the thrust element in the region of the door breastwork and at the same time shields it against dirt and moisture.

In order to activate the covering element safely and reliably, during a closing operation the covering element which is coupled to the thrust element is prestressed counter to the closing direction of the covering element. If the covering element is manufactured from a flexible, rollable and foldable material, for example a textile, in this way the closing operation of the covering element is made to take place without folding the covering element, and the covering element is stressed in its closed position. The prestressing on the covering element can be brought about, for example, by means of a spring which acts on a winding shaft, wherein, in the retracted state, the covering element is wound onto the winding shaft and unwound from the winding shaft in order to be deployed. The prestressing spring then counteracts the unwinding of the covering element.

Furthermore, the thrust element can be elastically stressed in the guide means in such a way that stressing when the covering element is closed is greater in a lower travel region than in an upper travel region. In the lower travel region, in which the covering element is located in the vicinity of its position of maximum opening, a greater degree of tensioning therefore counteracts the closing operation of the covering element than in an upper travel region in which the covering element is located in the region of its closed position. This measure is based on the idea that in the lower travel region the adjustment of the covering element by the drive generally takes place in a more easily moving fashion than in the upper travel region. Since a relatively large amount of stressing of the thrust element in the guide means is thus provided in the lower travel region, the ease of movement in the lower travel region is compensated for and uniform adjustment of the covering element is achieved over its entire travel region. In particular a vehicle occupant who is activating the drive device senses this to be pleasant since a uniform adjustment of the covering element accompanied by constant adjustment force and adjustment power is achieved, and possible difficulty of movement of the drive device in the upper travel region of the covering element cannot be perceived.

In one preferred embodiment of the drive device, the drive of the drive device has a winding device which can rotate about a rotational axis and is in the form of a spindle or a cable drum. The spindle or the cable drum are designed here to take up the transmission means, wherein the spindle or the cable drum are mounted so as to be rotatable about the rotational axis and to wind on the transmission means or unwind from it as a result of the rotation about the rotational axis. As a result of the winding on or unwinding from the transmission means, the thrust element which is coupled to the transmission means and has the purpose of moving the covering element is driven in the manner of a single-strand cable window lifter. Whether a spindle or a cable drum is used as the winding device is dependant, in particular, on the type of transmission means used. If the transmission means is embodied by means of a plastic cable with a small bending radius, a spindle with a small diameter onto which the plastic cable is wound is exemplary used. If, in contrast, a steel cable which generally has a large bending radius, that is to say is less flexible compared to the plastic cable, is used as the transmission means, a cable drum with a relatively large diameter onto which the steel cable is wound is exemplary used. The use of a spindle has in this context the advantage that an additional downstep transmission is not necessary between a motor of the drive and the spindle since a speed reduction has already been achieved by the small diameter of the spindle and the small travel which is therefore achieved per revolution of the spindle. The spindle can therefore be coupled directly to the motor and driven by it. If, on the other hand, a cable drum is used, an additional downstep transmission is generally necessary between the cable drum and the motor.

The transmission means which is embodied as a cable has, in the manner of a single-strand cable window lifter, two ends which are connected to the winding device in such a way that a rotation of the winding device in one rotational direction causes the transmission means to be wound on via the first end, and a rotation of the winding device in the other rotational direction causes the transmission means to be wound on via the second end. Winding on one end therefore directly entails unwinding of the other end, with the result that the transmission means which extend to and for between the drive and the deflection means in the guide means is moved, the length of the transmission means which extends in the guide means remains constant in the process, and the driver which is connected to the transmission means is displaced in the guide means. The thrust element coupled to the transmission means via the driver can in this way be moved in the opening direction or in the closing direction as a function of the direction of rotation of the winding device, by pushing the driver in the guide means.

In one exemplary configuration, the thrust element has, at its end projecting out of the guide means, a connecting element by means of which the thrust element can be connected to the covering element. The connecting element is arranged at the end of the thrust element facing away from the driver, produces the connection between the thrust element and the covering element and brings about a situation in which, when the thrust element is pushed, the covering element is moved together with the thrust element. By pushing the thrust element in the closing direction, the covering element is therefore pushed so as to cover the opening of the vehicle.

In the region of the connecting element on the thrust element, a bearing element is exemplary provided which is designed to guide the thrust element so that it slides along the opening. The background here is that, for example in the case of a roller blind, the intention is that it will be possible to activate the roller blind only if the opening which is to be covered, for example the window opening or vehicle door, is simultaneously closed off by a window pane. The thrust element is guided along the window pane by means of the bearing element and slides along the window pane into a position in which the window opening is covered by the covering element.

Additionally or alternatively, bearing elements can also be provided on the covering element itself, for example on a crossbar, referred to as the bow, of a roller blind which forms the covering element, wherein the additional bearing elements are designed to guide the covering element so that it slides along the opening. The additional bearing elements also interact with a plate which closes off the opening, and they cause the covering element to be guided in a sliding fashion along the opening which is closed off by the plate.

The object is also achieved by means of a door assembly of a vehicle door having a drive device of the type described at the beginning for activating a roller blind for covering a window opening in the vehicle door.

The door assembly exemplary additionally has a control device which is designed to control the drive device, wherein the control device is constructed in such a way that the drive device can be activated only if the window opening is closed by a window pane. For example, the control device can be configured in such a way that before the drive device is activated, the window pane is firstly closed in order subsequently to move the roller blind into its closed position. At the same time it is possible to provide that if an opening command for the window pane is issued when the roller blind is closed, the roller blind is firstly opened automatically in order subsequently to move the window pane. The control device also exemplary provides an automatic sequence which causes the roller blind to move automatically from its completely opened into its completely closed position when a closing command is issued, and conversely to move from its fully closed position into its fully opened position when an opening command is issued.

Furthermore, the object is also achieved by means of a method for mounting a drive device of the type described at the beginning. According to the invention, the method provides that the guide means of the drive device is arranged on the motor vehicle, the thrust element is inserted into the guide means in a mounting direction and the thrust element is connected to the transmission means of the drive device via a connecting device.

The idea on which the method for mounting the drive device is based is to divide the mounting of the drive device on a motor vehicle into two parts. At first, the guide means in this context is arranged on the motor vehicle and attached thereto. In a subsequent second step, the thrust element is then plugged into the guide means and detachably connected to the guide means. This permits the thrust element, which, at one of its ends has, for example, a connecting element for connecting the thrust element to the covering element through parts of the vehicle, for example through an opening in a door breastwork, to be connected to the guide means.

The connection of the thrust element to the transmission means is carried out, for example, by means of a driver which is guided in the guide means, by virtue of the fact that the thrust element is clipped into the driver via a corresponding connecting device.

The thrust element is exemplary inserted into a first part of the guide means and is detachably coupled to the transmission means via the driver. The thrust element can then be sealed with respect to the vehicle over a second part. For example, in this context it is conceivable that, in order to mount the drive device on a vehicle door, the thrust element is inserted through a door breastwork of the vehicle door, into the first part of the guide means which is arranged on the vehicle door. The second part of the guide means is then plugged into a guide opening of the door breastwork in order to seal the thrust element with respect to a wet space of the vehicle door. A significant advantage here is that simple mounting of the drive device on the vehicle is made possible without having to make substantial structural changes to the vehicle in order to adapt it to the drive device.

The object is also achieved by means of a method for mounting an adjustment system for covering an opening in a motor vehicle, in particular a roller blind, a baggage space cover or a sunroof cover. The adjustment system on which this method is based comprises here a planar covering element for covering the opening in the motor vehicle, a drive device having a drive, a guide means and a driver which is guided in the guide means and driven by the drive, and a longitudinally extended thrust element which is to be coupled to the drive and, in order to move the covering element, is connected in the mounted state at a first end to the driver and at a second end to the covering element.

According to an exemplary embodiment of the invention, for the purpose of mounting, the covering element and the drive device are firstly arranged on the motor vehicle or a vehicle component, and the thrust element is then inserted into the guide means and is connected by its first end to the driver, and by its second end to the covering element.

This method is based on the realization that in typical door systems the thrust element cannot be mounted together with the drive device on the vehicle door since the drive device has to be arranged within the door box and the thrust element cannot be connected to the covering element outside the door box until the vehicle door is completely mounted. According to the present method, the thrust element is therefore mounted in a subsequent working step after the drive device and the windable covering element, which is arranged for example on a winding shaft, have already been mounted on the vehicle door, by virtue of the fact that the thrust element is inserted into the door box and into the guide means of the drive device and is connected at one of its end to the driver and at its other end to the covering element. The mounting is therefore carried out in a modular fashion: at first the drive device and the covering element are arranged separately on the vehicle or the vehicle door in order to be subsequently connected to one another via the thrust element.

If the planar covering element is arranged on a winding shaft, the thrust element is connected to an edge, at a distance from the winding shaft, of the covering element which is embodied, for example, as a roller blind. The thrust element therefore acts on the free edge of the covering element which is not connected to the winding shaft, and said thrust element transmits an adjustment force to the covering element.

The connection of the thrust element to the driver is exemplary of a disconnectable design so that after mounting the connection can be disconnected, for example for dismounting or when an excessive force acts owing to a case of trapping.

The connection of the thrust element to the driver can be embodied, for example, as a clip connection. The clipping-in operation in order to produce the connection between the thrust element and the driver here exemplary requires less force to be expended than the unclipping in order to disconnect the connection, with the result that the mounting of the thrust element is, on the one hand, easy and possible without a large application of force while, on the other hand, the dismounting cannot take place until after a predetermined, relatively large force has been applied. This prevents undesired dismounting and increases the operational reliability. The clipping-in operation can exemplary be heard and/or felt here in particular in order to increase the operator friendliness, with the result that the production of the connection between the driver and the thrust element is indicated to the operator directly and clearly.

Alternatively, the connection of the thrust element to the driver can also be embodied as a screwed connection, wherein the thrust element has, at its first end, a thread which is screwed into a thread receptacle on the driver in order to produce the connection.

In addition it is conceivable for the connection of the thrust element to the driver to be configured as a bayonet connection which can be activated by rotating the thrust element. The thrust element is plugged into the guide means here for the purpose of mounting and, as a result of a rotation about its longitudinal axis, is connected to the driver and can be disconnected again by a reverse rotation for the purpose of dismounting.

In one development, an additional guide element can be provided which is plugged onto the thrust element before mounting, and is connected to the motor vehicle or to the vehicle component after the thrust element has been inserted into the guide means of the drive device. This is based on the idea that, in addition to the guide means of the drive device, a further support point for the thrust element should be made available on the vehicle in order thus to achieve optimum guidance of the thrust element on the vehicle.

In the preceding embodiment, the additional guide element is mounted on the vehicle after the thrust element has been plugged into the guide means. However, it is alternatively also possible to provide for the additional guide element firstly to be arranged on the motor vehicle or the vehicle part and for the thrust element to be subsequently inserted into the guide means of the drive device and into the additional guide element. Finally, in a third alternative variant, after the thrust element has been inserted into the guide element of the drive device the additional guide element is plugged onto the thrust element, after which a connecting element for connecting the thrust element to the covering element is arranged on the thrust element. In this last variant, the additional guide element is therefore attached subsequently by firstly leaving the second end of the thrust element free and then attaching the connecting element after the additional guide element has been plugged on, as a result of which the guide element is simultaneously prevented from slipping off the thrust element.

In a further exemplary embodiment, the longitudinally thrust element is extended designed in the same way at its first and second ends, with the result that the thrust element can be inserted either by its first end or by its second end into the guide means. The thrust element can therefore be plugged into the guide means at either end and mounted independently of its orientation. As a result of the symmetrical configuration of the thrust element, incorrect installation owing to incorrect orientation of the thrust element is prevented, and therefore mounting is made easier and the susceptibility to faults is reduced.

In a transportation position in which the adjustment system is delivered the thrust element is advantageously arranged on a roller blind box which holds the covering element or on a bow which is connected to the covering element, and for the purpose of mounting it is removed from the roller blind box or pivoted by the bow in order to be connected to the driver. The thrust element is therefore not delivered loose but rather together with and in a unitary fashion with the other components of the adjustment system. It is conceivable here that the thrust element be connected in an articulated fashion to the bow, be arranged and delivered parallel to the bow in the transportation position, and for mounting purposes be then pivoted through 90° with respect to the bow in order to be inserted into the guide means of the drive device on the vehicle.

Alternatively it is also possible to plug the thrust element into the guide means for the purpose of delivery, and for the purpose of mounting to then firstly take it out of the guide means, and after the guide means has been attached to then insert it into the guide means.

The drive device, composed of the drive, the guide means and the driver, can be delivered as a separate, pre-testable unit. This has the advantage that the drive device is already checked for correct functionality before mounting and can then be arranged as a unit on the vehicle. However, it is, of course, also conceivable to deliver the drive device in individual parts and to mount it, for example, on a carrier plate of a vehicle door, in which case a functionally capable unit is not produced until the parts are mounted on the carrier plate.

BRIEF DESCRIPTION OF THE DRAWINGS

The idea on which the invention is based will be explained below in more detail with reference to the exemplary embodiments which are illustrated in the figures, of which figures:

FIG. 2 is a front, partially transparent view of just the drive device according to FIG. 1 with inserted thrust element.

FIG. 3 is a front, partially transparent view of just the drive device according to FIG. 1 with an extracted thrust element.

FIG. 4A shows a detail view of the cut-away spindle, the transmission means, the driver and the thrust element of the drive device according to FIG. 2.

FIG. 4B shows an enlarged detail view of the region A of FIG. 4A.

FIG. 6A shows a detail view of the upper region of the drive device according to FIG. 5A to FIG. 5C.

FIG. 6B shows a cross-sectional view along the line I-I according to FIG. 6A.

FIG. 6C shows a cross-sectional view along the line II-II according to FIG. 6A.

FIG. 6D shows a cross-sectional view along the line III-III according to FIG. 6A.

FIG. 9A shows a perspective detail view of the lower region with the deflection means and the driver of the drive device according to FIGS. 5A to 5C.

FIG. 9C shows a perspective detail view of the driver of the drive device according to FIGS. 5A to 5C.

FIG. 10 shows an exploded view of the drive device according to FIGS. 5A to 5C.

FIG. 13A shows a lateral, partially transparent view of the drive device according to FIG. 11.

FIG. 13B shows a lateral, partially transparent view of the upper part of the drive device according to FIG. 13A, corresponding to area C in FIG. 13A, in a state in which it is mounted on a vehicle door.

FIG. 14B shows a front view of the drive device according to FIG. 14A.

FIG. 14C shows a side view of the drive device according to FIG. 14A.

FIG. 15A shows a cross-sectional view through the drive device according to FIG. 14A.

FIG. 15B shows an enlarged detail of the region C of the cross-sectional view according to FIG. 15A.

FIG. 16A shows a front view of the cut-away transmission means, of the driver, of the thrust element and of the cable drum of the drive device according to FIG. 14A.

FIG. 16B shows a side view of the cut-away transmission means, of the driver, of the thrust element and of the cable drum of the drive device according to FIG. 14A.

FIG. 17 shows a perspective detail view of the cable drum of the drive device according to FIG. 14A.

FIG. 18 shows a front, partially transparent detail view of the cable drum of the drive device according to FIG. 14A.

FIG. 19 shows a perspective detail view of the driver of the drive device according to FIG. 14A.

FIG. 20A shows a front, partially transparent detail view of the driver of the drive device according to FIG. 14A.

FIG. 20B shows a cross-sectional view through the driver along the line IV-IV according to FIG. 20A.

FIG. 28A shows a schematic side view of a roller blind on a vehicle door in the extended state.

FIG. 28B shows a schematic front view of a roller blind on a vehicle door in the extended state.

DETAILED DESCRIPTION

Figure 1:
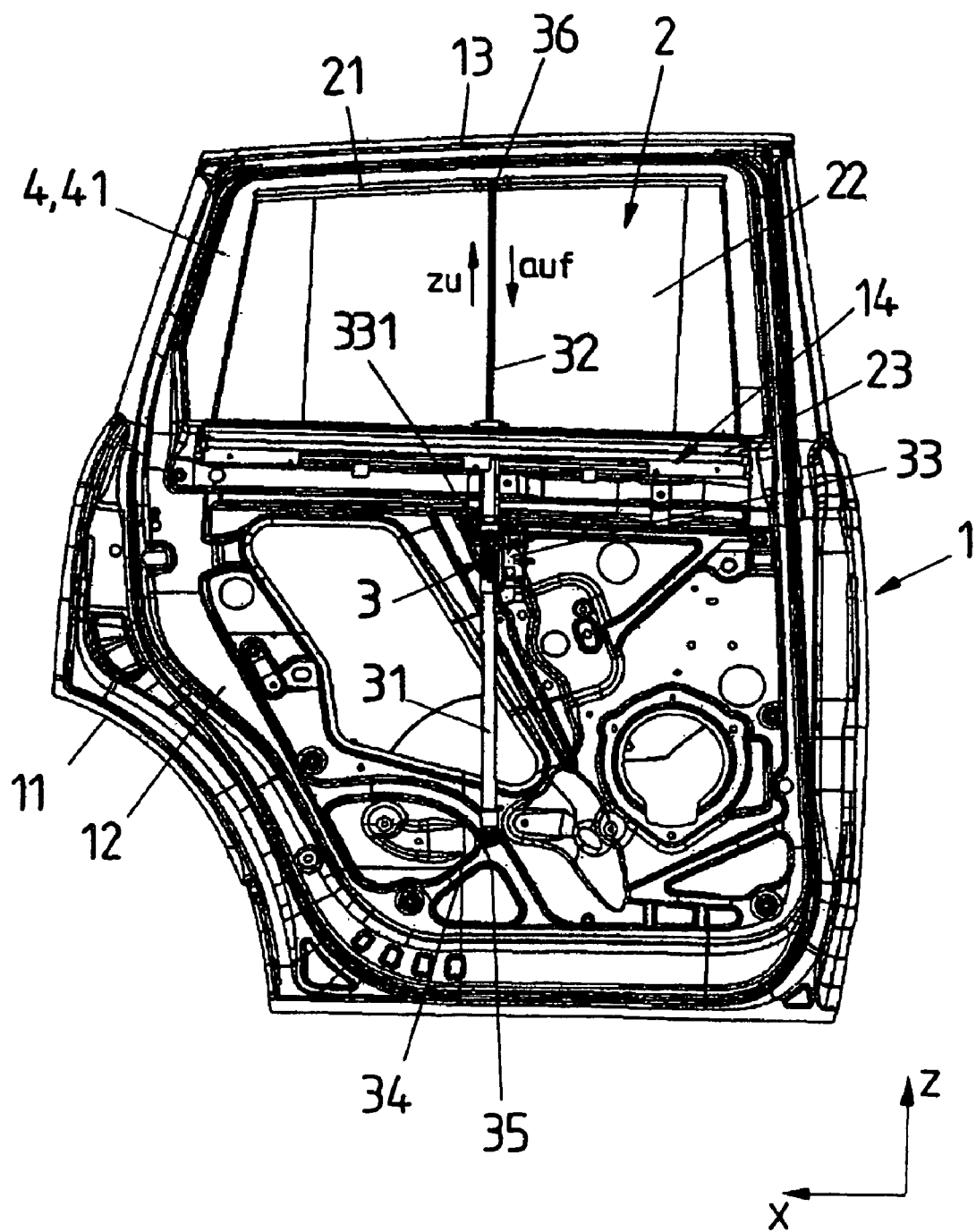
FIG. 1 is a front view of a drive device with a drive which has a spindle, for a roller blind on the door inside panel of a vehicle door.

FIG. 1 shows a drive device 3 in the mounted state on a vehicle door 1 which, in order to activate a roller blind 2, is connected to a crossbar 21, referred to as the bow, of the roller blind 2, and moves the roller blind 2 upward in a closing direction ZU in order to cover a window opening 4 in the vehicle door 1, or moves it downward in an opening direction AUF in order to clear the window opening 4.

In the embodiment illustrated in FIG. 1, the drive device 3 is arranged on the door inside panel 12 of the vehicle door 1 and is connected via attachment points 35, 336 in the region of its deflection means 34 to the lower end of a guide means 31, and in the region of a drive 33 in the upper region of the guide means 31 of the drive device 3 to the door inside panel 12. In the guide means 31, a thrust element 32 in the form of a thrust rod is guided, which thrust element 32 extends from the guide means 31, which is arranged completely in the region of the door interior, formed by the door outside panel 11, the door inside panel 12 and a door inside trim (not illustrated in FIG. 1) which covers the door inside panel 12, of the vehicle door 1 into the region of the window opening 4 and is connected at its upper end to the bow 21 of the roller blind 2 via a connecting element 36. The thrust element 32 is pressure-resistant and embodied in a flexurally rigid fashion such that it can push the roller blind 2 into the region of the window opening 41 even as it is extended out of the guide means 31, and can hold it there.

The roller blind 2 is adapted in its shape to the window opening 4, and in the closed state in which the bow 21 of the roller blind 2 bears against an upper frame element of the window frame 13 of the vehicle door 1 it covers the window opening 4 virtually completely. The roller blind has a curtain 22 which is connected to the bow 21 and is composed of a material, in particular a textile, which is constructed such that the inside is protected against solar radiation. The curtain 22 is formed, for example, from a non-transparent and non-translucent material which screens the passenger compartment completely against solar radiation. However, the curtain 22 can also be formed from a partially transparent material which merely attenuates the solar radiation.

The present invention is based on the idea of constructing a drive device 3 for activating a covering element 2, for example a roller blind, in the manner of a single-strand cable window lifter. In particular, in this context a transmission means 38 is provided which connects the drive 33 to the thrust element 32, extends at least in certain sections in the guide means 31 and is therefore largely enclosed in the guide means 31. During operation, the drive 33 moves the transmission means 38, and via the transmission means 38 moves the thrust element 32 and therefore the covering element in the form of the roller blind 2 in the closing direction ZU into its closed position or in the opening direction AUF out of its closed position.

Figure 11:
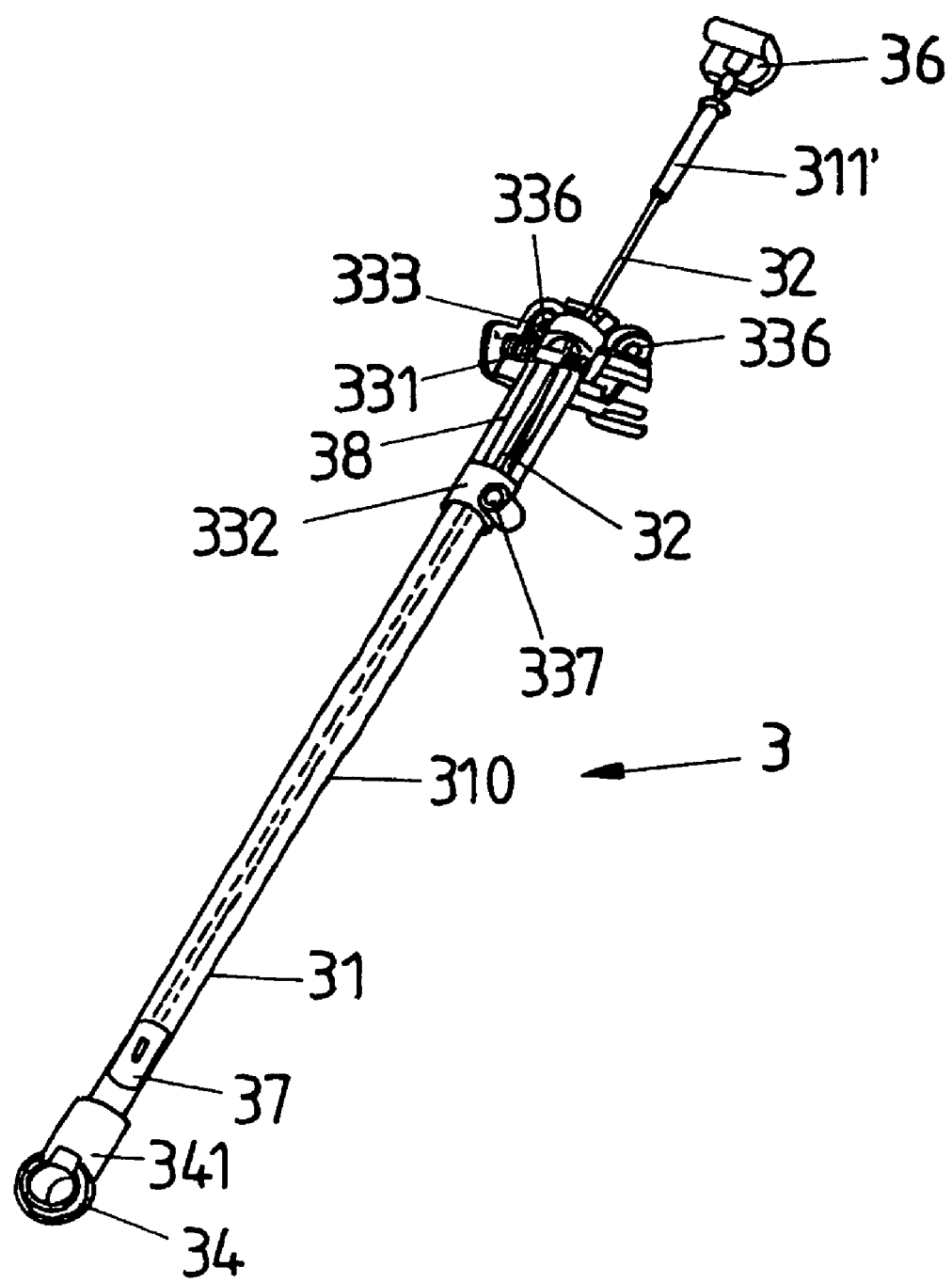
FIG. 11 shows a perspective view of a variant of the drive device according to FIG. 1 with a separately formed, second part of the guide means.
Figure 12:
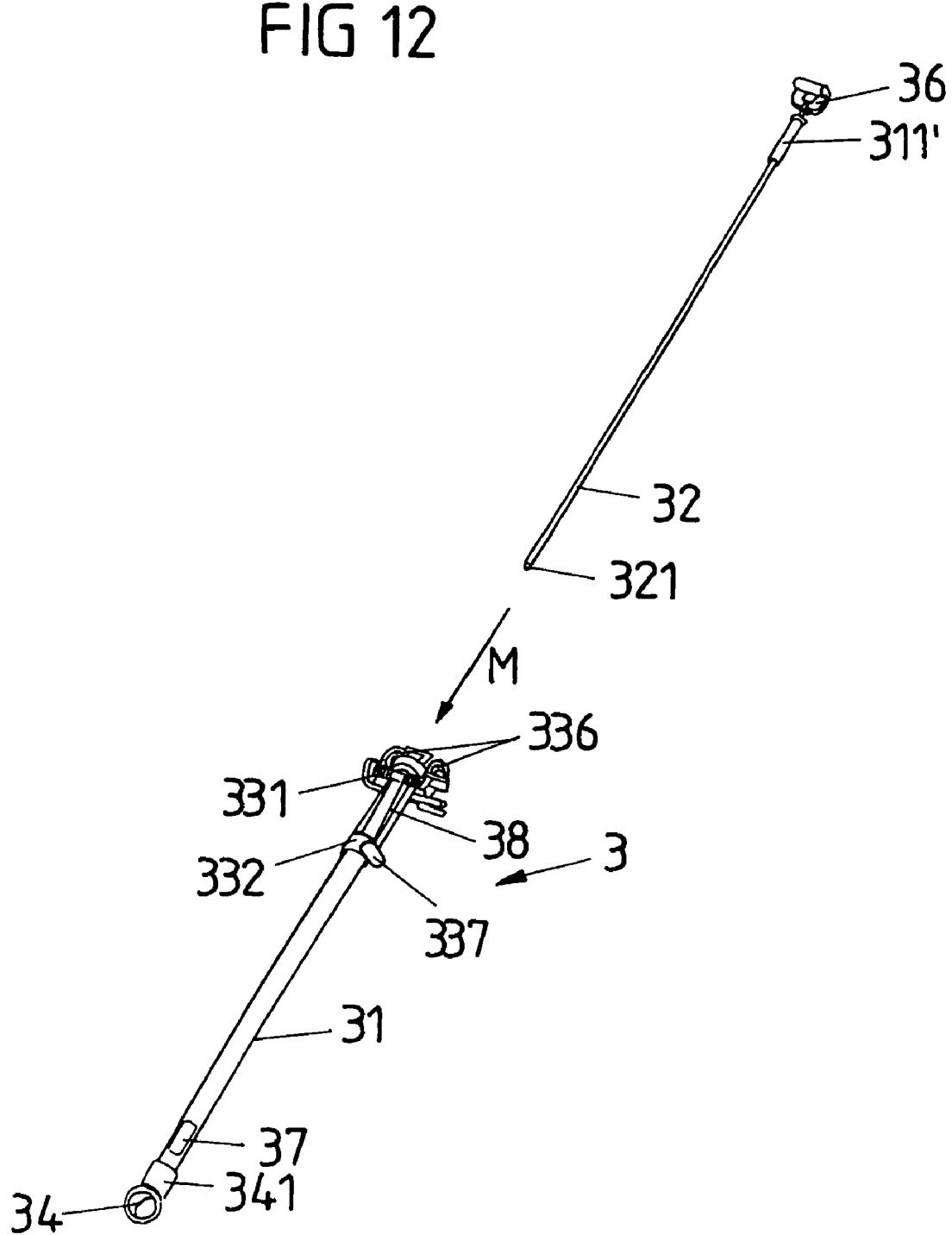
FIG. 12 shows a perspective illustration of the arrangement according to FIG. 11 before the mounting of the drive device.

FIGS. 2 to 13 illustrate variants of a first embodiment of the drive device 3 according to FIG. 1 in which a drive 33 with a spindle 331 is used. Components with identical functions are provided here, where appropriate, with the same reference signs. The illustrated variants differ only in the construction of a second part 311 or 311' of the guide means 31 but are otherwise structurally and functionally identical. FIGS. 2 and 3 show here a first variant of the drive device 3, FIGS. 5 to 8 and 10 show a second variant thereof and FIGS. 11 to 13 show a third variant thereof. FIG. 4 shows a detail view of a driver 37, and FIGS. 9A to 9C show detail views of a deflection means 34, which are each used in all the variants according to FIGS. 2 to 13.

The drive device 3 according to FIGS. 2 to 13 has a drive 33, a guide means 31, a transmission means 38 in the form of a cable, and a thrust element 32 in the form of a pull rod. The transmission means 38 is connected to a driver 37 and coupled to the thrust element 32 via the driver 37.

The thrust element 32, which, as has been illustrated for example in FIGS. 3 and 10, is of rod-shaped and pressure-resistant design, is guided in the guide means 31 of the drive device 3. The guide means 31 has, in its lower region, a first part 310 in which the thrust element 32 is mounted in a sliding fashion by means of the driver 37. The driver 37 is moved by the transmission means 38 between a home position, in which the driver 37 is arranged in the region of the deflection means 34, and an end position, in which the driver 37 is arranged in the region of the drive 33 of the drive device 3, wherein, in the home position, that is to say when the driver 37 is arranged in the region of the deflection means 34, the thrust element 32 is inserted completely or at least largely into the guide means 31 (as illustrated in FIGS. 2 and 5) and the roller blind 2 is opened, while in the end position the thrust element 32 is pushed as far as possible out of the guide means 31 and the roller blind 2 is in its closed, covering position (see FIG. 1).

The transmission means 38 extends from a spindle 331 of the drive 33 through a cutout 334 into the guide means 31, runs from the spindle 331 in the guide means 31 to a deflection means 34 at a lower end of the guide means 31, is deflected by the deflection means 34 and runs from the deflection means 34 in the guide means 31 back to the spindle 331 of the drive 33.

The deflection means 38 is, as is apparent in the illustration in FIGS. 4A and 10, connected at both its ends to the spindle 331 and forms two cable components 38a, 38b which run parallel to one another in the guide means 31 of the drive device 3.

The driver 37, the drive 33 and the deflection means 34, which are of identical design in the variants according to FIGS. 2 to 13, will be explained in greater detail below with reference to FIGS. 2 to 13.

For the purpose of coupling to the thrust element 32, the transmission means 38 is connected to the driver 37, which is in turn coupled to the thrust element 32. FIGS. 4B and 9C show detail views of the driver 37. The driver 37 is securely connected at one of its sides via a cable nipple 381 to one 38a of the cable components of the transmission means 38, with the result that when the cable component 38a moves the driver 37 is moved with the cable component 38a. If the transmission means 38 is therefore moved by the spindle 331 in such a way that the cable component 38a in FIG. 4B is moved upward, and the cable component 38b is moved downward, the driver 37 moves upward together with the cable component 38a.

The driver 37 is connected to the thrust element 32 in the form of the thrust rod and produces the connection between the thrust element 32 and the transmission means 38. The driver 37 has, as illustrated in FIG. 4B, a spring-elastic element 371 which in its upper region is securely connected to the driver 37 and in its lower region is of spring-elastic design. The driver 37 respectively has at its upper end and at its lower end an opening 372 and 373, respectively, through which the thrust element 32 can be inserted into the driver 37. At the lower end of the thrust element 32, a clip element 321 in the form of a ball is formed, which ball can be engaged with the spring-elastic element 371 of the driver 37, with the result that the thrust element 32 is held in the driver 37.

The connection between the thrust element 32 and the driver 37 is exemplary of disconnectable design. In the embodiment according to FIG. 4B, the thrust element 32 can be inserted into the driver through the upper opening 373 in the driver 37, for example for the purpose of mounting, and is engaged with the spring-elastic element 371 of the driver 37 by virtue of the fact that the clip element 321 latches, at the lower end of the thrust element 32 into the spring-elastic element 371 of the driver 37. Since the spring-elastic element 371 is of elastic design, the thrust element 32 can, for example for the purpose of dismounting, be detached from the driver 37 by pulling the thrust element 32 out of the driver 37 and therefore disengaging the clip element 321 on the thrust element 32 from the spring-elastic element 371 of the driver 37.

The connecting device in the form of the spring-elastic element 371 and the clip element 321 of the driver 37, or respectively of the thrust element 32, is configured in such a way that the connection can not only be disconnected when a tensile force is applied to the thrust element 32 in the closing direction ZU, but also the connection between the thrust element 32 and the driver 37 can also be disconnected when a compressive force is applied in the opening direction AUF. If a compressive force is applied in the opening direction AUF, the thrust element 32 is forced downward, with the result that the clip element 321 disengages from the spring-elastic element 371, and the thrust element 32 is forced through the spring-elastic element 371 and through the opening 372 in the lower region of the driver 37.

Providing the possibility of disconnecting the connection when either a tractive force or a compressive force is applied to the thrust element 32 is expedient in particular in order to ensure effective protection against trapping. If an object is trapped between the bow 21 of the roller blind 2 and the window frame 13 of the vehicle door 1 (see FIG. 1), when the roller blind 2 is moving in the closing direction ZU, the thrust element 32 experiences a compressive force which is directed in the opening direction AUF. The spring-elastic element 371 is configured here in such a way that, when a specific compressive force in the closing direction AUF is exceeded, the connection between the thrust element 32 and the driver 37 is disconnected and the thrust element 32 is forced downward by the driver 37. The roller blind 2 can then be moved downward, with the result that an object is prevented from becoming trapped between the roller blind 2 and the window frame 13. The spring-elastic element 371, which may be embodied, for example, as a steel spring, determines, by means of its rigidity, the force which is necessary to disconnect the connection, and it can be matched, in accordance with the trapping protection, to the forces occurring in the case of trapping.

As already mentioned above, the transmission means 38 is connected by both of its ends to the spindle 331 of the drive 33 and extends downward from the spindle 331, is deflected by the deflection means 34 and extends back to the spindle 331. The transmission means passes through the cutout 334 into the interior of the guide means 31 and is guided there virtually over its entire length in the interior of the guide means 31. By virtue of the fact that the transmission means 38 is integrated into the guide means 31, a compact design of the drive device 3 can be achieved, in which case the necessary installation space is minimized and both the transmission means 38 and the thrust element 32 are largely shielded against dirt and moisture by the guide means 31.

Figure 9B:
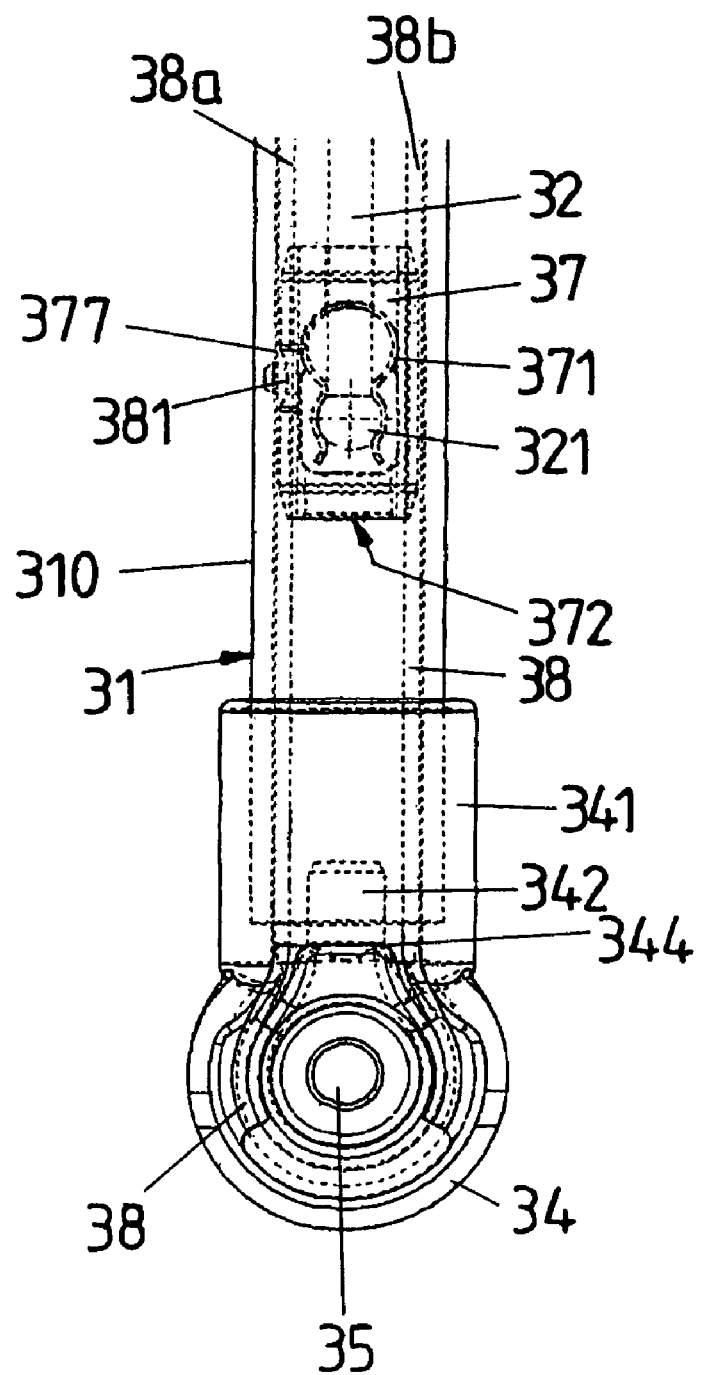
FIG. 9B shows a front, partially transparent view of the lower region with the deflection means of the drive device according to FIGS. 5A to 5C.

FIG. 9B shows a detail view of the deflection means 34. The deflection means 34 is plugged onto the lower end of the guide means 31 and has a projection 341 into which the guide means 31 is plugged in order to produce a connection between the guide means 31 and the deflection means 34. It is conceivable and advantageous in this context to provide a spring-elastic element in the projection 341, which spring-elastic element acts between the lower end of the guide means 31 and the deflection means 34 in such a way that the guide means 31 is elastically connected to the deflection means 34 in the direction Z of the extent of the guide means 31. The elastic connection can serve here to compensate the length of the transmission means 38 and has an effect that if the transmission means is not sufficiently rigidly tensioned between the drive 33 and the deflection means 34, the deflection means 34 is forced downward in relation to the guide means 31, counter to the Z direction, with the result that the distance between the deflection means 34 and the drive 33 is increased and the transmission means 38 is therefore tensioned.

As is apparent in FIG. 9B, the deflection means 34 has a bolt 342 which is arranged in the region of a stop 344 of the deflection means 34. The stop 344 serves to define the home position of the driver 37 in the guide means 31. In the home position, the lower edge of the driver 37 bears against the stop 344, and the driver 37 is therefore in a lower position in the guide means 31 in which the thrust element 32 is virtually completely inserted into the guide means 31. In this position, the bolt 342 which serves as a locking means engages through the opening 372 in the lower region of the driver 37, with the result that the driver 37 is secured in the guide means 31. The secure connection is brought about in such a way that the driver 37 is held in a positively locking fashion transversely with respect to the direction Z of the extent of the guide means 31 by the bolt 342, and the driver 37 is arranged in a rattle-free fashion in this position in the region of the deflection means 34.

Figure 7:
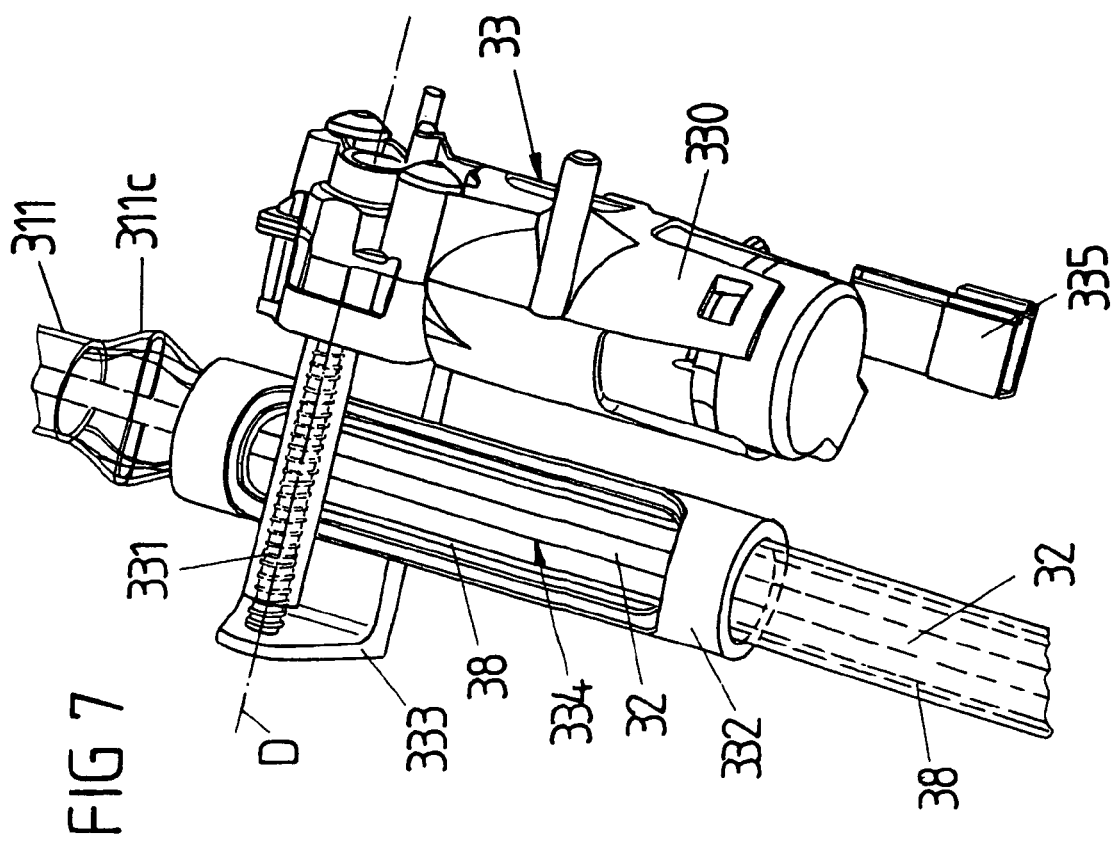
FIG. 7 shows a perspective detail view of the drive of the drive device according to FIGS. 5A to 5C.

FIGS. 6 and 7 show the drive 33 of the drive device 3 in detail. The transmission means 38 is connected by both of its ends to the spindle 331 of the drive 33, in which case, in order to move the driver 37, the transmission means 38 is wound on over one of its ends and unwound over its other end and in this way is moved in the guide means 31. The drive 33 has a motor 330 which drives a drive shaft 331' (see FIG. 10) and as a result causes the spindle 331 to rotate about its rotational axis D (see FIGS. 2 and 7) around which the spindle 331 is rotatably mounted on a housing base part 333 of the drive 33. The drive 33 also has an electrical terminal 335 via which the motor 330 is supplied with electricity.

The spindle 331 has, as is apparent in particular in the enlarged illustration according to FIG. 7 and the exploded illustration according to FIG. 10, a worm toothing on its outer circumference, which worm toothing is designed to take up the two ends of the transmission means 38 which are connected to the spindle 331. The transmission means 38 is connected to the spindle 331 in such a way that winding the transmission means 38 on over one of its ends causes the transmission means 38 to be unwound over the other end. As a result of this the overall length of the transmission means 38 which extends in the guide means 31 is constant and as a result of the winding on of one of the ends and unwinding of the other end the transmission means 38 is moved in the guide means 31.

Figure 5A:
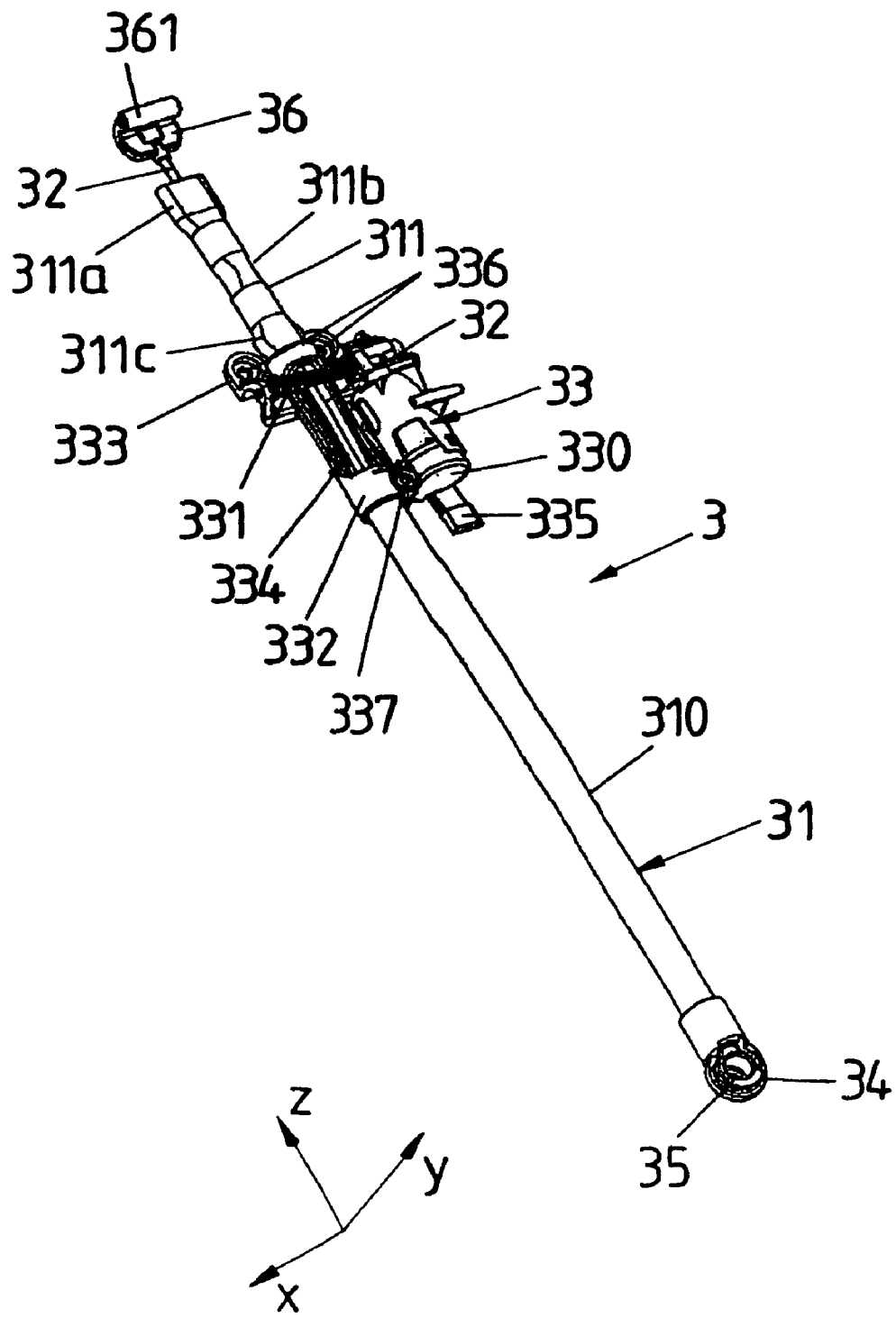
FIG. 5A shows a perspective view of a drive device with constrictions in a second part of the guide means for guiding the thrust element.
Figure 5B:
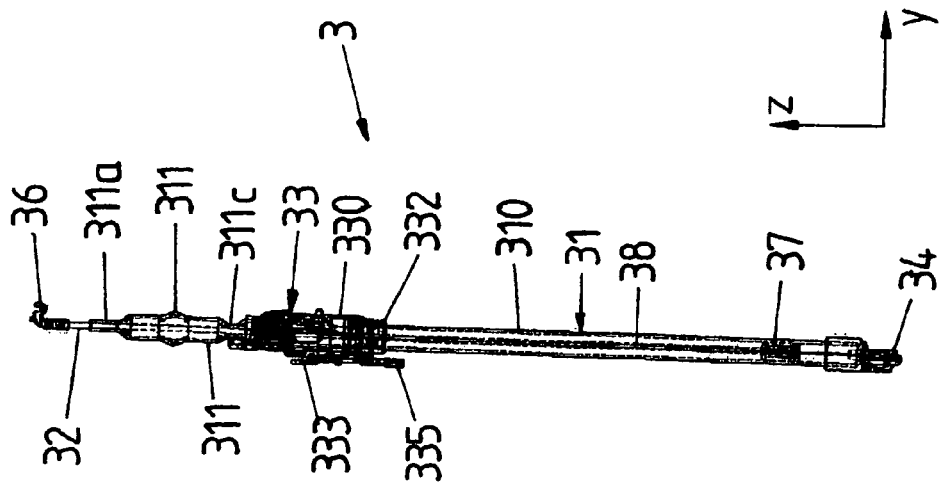
FIG. 5B shows a front, partially transparent view of the drive device according to FIG. 5A.
Figure 5C:
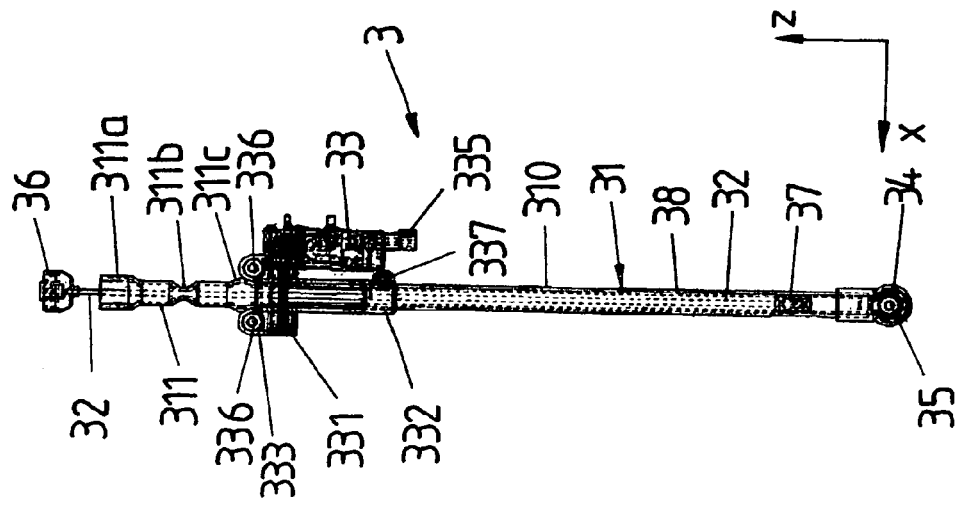
FIG. 5C shows a lateral, partially transparent view of the drive device according to FIG. 5A.
Figure 8:
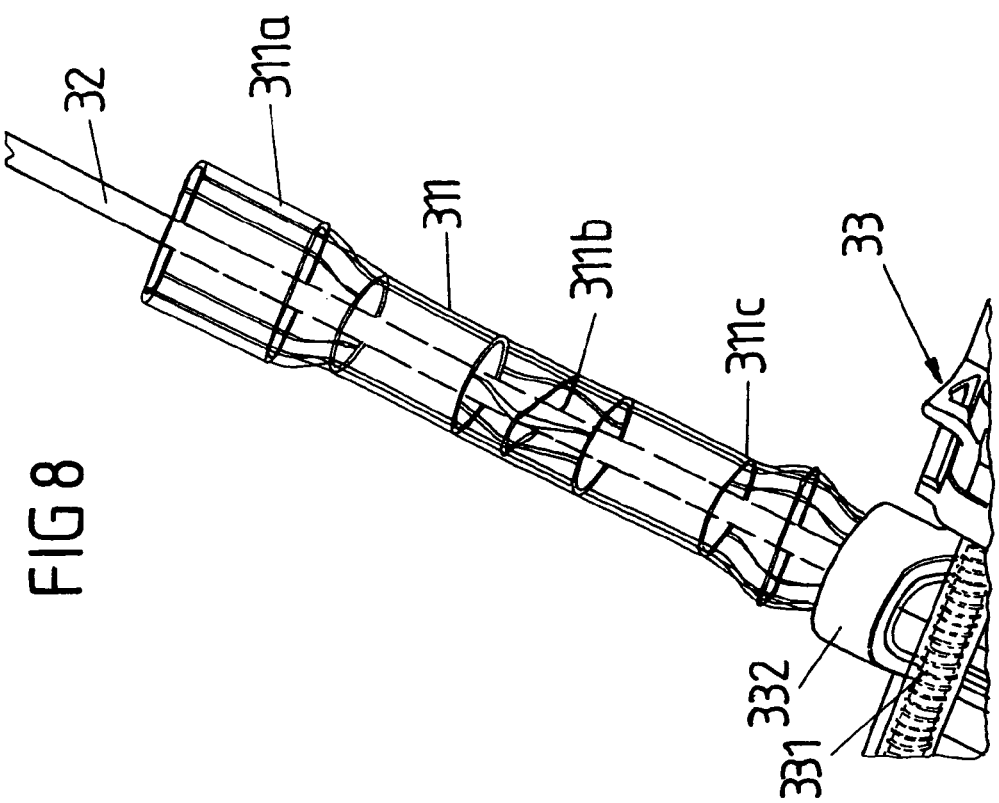
FIG. 8 shows a perspective detail view of the second part of the guide means of the drive device provided with constrictions, according to FIGS. 5A to 5C.

The worm toothing which is arranged on the outer circumference of the spindle 331 and has the purpose of taking up the transmission means 38 is constructed in such a way that the ends of the transmission means 38 are wound on or unwound in an ordered fashion by virtue of the fact that the turns of the transmission means 38 rest one against the other in an ordered fashion in the worm toothing as winding on takes place, as is illustrated, for example, in FIGS. 5A and 10.

The winding of the transmission means 38 onto the spindle 331 is exemplary configured in such a way that in an upper position of the driver 37 in which the driver 37 is arranged in the immediate vicinity of the spindle 331 the transmission means 38 extends perpendicularly from the spindle 331 to the driver 37 and the attachment point of the transmission means 38 to the spindle 331 is therefore located immediately above the guide means 31. As a result of this, in the upper position of the driver 37 the transmission means 38 does not extend obliquely between the spindle 331 and the driver 37. This is advantageous since in this way forces which extend essentially longitudinally with respect to the guide means 31 are transmitted to the driver 37 in the upper position and as a result the application of transverse forces to the driver 37 is avoided. The driver 37 is illustrated in its upper position, for example, in FIG. 25 in a different embodiment of the drive device 3, but said embodiment is functionally identically acting.

The housing base part 333 of the drive 33 serves to support the spindle 331 and to connect the motor 330 to the spindle 331 via the drive shaft 331', and said housing base part 333 is illustrated in detail in FIG. 7. The housing base part 333 supports the spindle 331 which extends transversely with respect to the direction of extent of the guide means 31 (corresponding to the Z direction) in the direction of the rotational axis D. The housing base part 333 is connected to a sleeve 332 into which the guide means 31 is inserted for the purpose of mounting, in order to connect the guide means 31 to the drive 33. An attachment point 337, via which the sleeve 332 is connected in a clamping fashion to the guide means 31 by means of a screwed connection is formed on the sleeve 332. Furthermore, attachment points 336, via which the drive device 3 is attached to the vehicle door 1 (see FIG. 1), are formed on the housing base part 333.

A further attachment point 35 is formed on the deflection means 34 and serves to attach the drive device 3 to the vehicle door 1 in the lower region of the guide means 31.

The use of a drive 33 with a spindle 331 for winding on the transmission means 38 is expedient, in particular in conjunction with a transmission means 38 which is formed by a plastic cable. A plastic cable has a small bending radius and can therefore be wound onto the spindle 331 in small turns. The use of a spindle 331 in the sense of the variants according to FIGS. 2 to 13 has the advantage that there is no need to provide an additional downstep transmission between the motor 330 and the spindle 331 of the drive 33. Since the spindle 313 has a small diameter, only a relatively short piece of the transmission means 38 is wound onto the spindle 331 or unwound from the spindle 331 per revolution of the spindle 331, with the result that a revolution of the spindle 331 is transmitted into a relatively small travel distance of the transmission means 38, and thus of the driver 37.

In the variants according to FIGS. 2 to 13, there is also provision for the deflection of the transmission means 38 in the region of the drive 33 to be performed directly by the spindle 331. It is therefore not necessary to provide a further deflection in addition to the deflection means 34, which, on the one hand, permits considerable simplification of the design of the drive device 3, and on the other hand improves efficiency by minimizing components which are subject to friction.

The driver 37 is guided in the first part 310 of the guide means 31. In this context, it is conceivable and advantageous to provide one or more elastic elements on the outer circumferential face, facing the wall of the guide means 31, of the essentially cylindrically shaped driver 37, by means of which elastic elements the driver 37 is guided damped in the guide means 31, in the transverse direction with respect to the direction of extent (corresponding to the Z direction) of the guide means 31. If the driver 37 is constructed from plastic, the elastic elements are, for example, integrally injection-molded onto the driver 37 in the region of its outer circumference by means of a two component technique, and they bring about a tensioning, damping transverse force between the driver 37 and the guide means 31. The elastic elements permit in this way play-free and rattle-free guidance of the driver 37 in the first part 310 of the guide means 31.

The guide means 31 serves to guide the thrust element 32. In this context, in the mounted state the guide means 31 extends exclusively outside the region of the window opening 4 which is to be covered by the covering element, in FIG. 1 this is the roller blind 2, which is to be connected to the thrust element 32. By moving the driver 37, the thrust element 32 is pushed out of the guide means 31 and into the region of the opening 4 which is to be covered.

The guide means 31 has, as explained above, a first part 310 in which the driver 37 and the thrust element 32 which is coupled to the driver 37 are guided. In addition, the guide means 31 has a second part 311 or 311', in the design of which the variants of the drive device 3 according to FIGS. 2 to 3, FIGS. 5 to 10 and FIGS. 11 to 13 differ.

In the first part 310 of the guide means 31, the thrust element 32 is guided by means of the driver 37. At the same time it is necessary for the thrust element 32 also to be guided in the region of a second part 311 or 311' of the guide means 31 in such a way that the displacement path of the thrust element 32 is determined completely. This is achieved in different ways in the variants according to FIGS. 2 to 3, FIGS. 5 to 10 and FIGS. 11 to 13.

In the variant according to FIGS. 2 to 3, the guide means 31 is of tubular design in the second part 311, with the result that the rod-shaped thrust element 32 does not bear against the guide means 31. It is therefore necessary to provide an additional guidance point of the thrust element 32, which guidance point can be implemented, for example by a guide bushings, in the region of the door breastwork 14 of the vehicle door 1 and therefore outside the guide means 31.

In contrast, in the variant according to FIGS. 5 to 10, the guide means 31 is adapted in terms of its shape in the second part 311 in such a way that the thrust element 32 is guided in the second part 311 of the guide means 31. As is illustrated in FIGS. 5A to 5C, FIG. 6 and FIG. 8, the guide means 31 has, in the second part 311, constrictions 311A, 311B, 311C which are of elongate design in cross part (see FIG. 6) and correspond in their narrow width to the diameter of the rod-shaped thrust element 32. By virtue of the fact that the constrictions 311A, 311B, 311C which are of elongate design are offset with respect to one another by, in each case, a 90° angle in their orientation in the transverse direction with respect to the direction Z of extent of the guide means 31, completely determined guidance in the transverse direction with respect to the direction of extent of the guide means 31 is brought about in the region of the second part 311. This is clear in particular in the cross-sectional views according to FIGS. 6B to 6D which show the guide means 31 in cross part along the line I-I, II-II, III-III according to FIG. 6A.

In the variant according to FIGS. 5 to 10, the thrust element 32 is therefore additionally guided in the second part 311 of the guide means 31. The constrictions 311A, 311B, 311C in the second part 311 of the guide means 31 can be produced here, for example, by hot forming of the guide means 31 which is constructed from plastic.

In order to permit the thrust element 32 to be mounted in the guide means 31, the second part 311 is exemplary made sufficiently elastic in the region of its constrictions 311a, 311b, 311c for the thrust element 32 to be able to be inserted into the guide means 31 using the clip element 321 which is arranged at the lower end of the thrust element 32.

In the variants according to FIGS. 2 to 10, the guide rail 31 is constructed in one piece with its first part 310 and its second part 311. In the variant according to FIGS. 5 to 10, the second part 311 of the guide means 31 which is connected to the first part 310 causes the thrust element 32 to be guided also above the drive 33, therefore ensuring reliable guidance of the thrust element 32.

A third variant of the drive device 3 is illustrated in FIGS. 11 to 13. In contrast to the variants according to FIGS. 2 to 3 and FIGS. 5 to 10, the guide means 31 in the variant according to FIGS. 11 to 13 is constructed in two parts and has a second part 311' which is not connected to the first part 310 of the guide means 31. The second part 311' is adapted in its diameter to the thrust element 32 and bears against the rod-shaped thrust element 32.

As is illustrated in FIG. 12, for the purpose of mounting the thrust element 32 is inserted in the mounting direction M into the first part 310 of the guide means 31 together with the second part 311' which is plugged onto the thrust element 32, and said thrust element 32 is connected, using the clip element 321, to the driver 37 in the first part 310 of the guide means 31. As has already been explained above with reference to FIG. 4B, the connection between the thrust element 32 and the driver 37 is disconnectable and can be released, for example, for the purpose of dismounting the drive device 3 by pulling the thrust element 32 out of the driver 37 counter to the mounting direction M, and therefore pulling it out of the guide means 31. At the same time, the disconnectable connection constitutes a measure for providing protection against trapping by virtue of the fact that, as has been explained with reference to FIG. 4B, the connection between the thrust element 32 and the driver 37 can also be disconnected when a compressive force is applied in the mounting direction M. The connection between the driver 37 and the thrust element 32 is configured here in such a way that when a specific compressive force is exceeded the connection is automatically disconnected in order in this way to prevent an object becoming trapped between a covering element, in FIG. 1 this is the roller blind 2, which is moved by the thrust element 32.

The second part 311' of the guide means 31, which is displaceably arranged on the thrust element 32, serves, on the one hand, to guide the thrust element 32 and, on the other hand, to seal the thrust element 32 with respect to penetration of dirt and moisture from the outside. For this purpose, as is illustrated in FIG. 13A and, in particular, in the enlarged illustration according to FIG. 13B, the drive device 3 is arranged on the vehicle (in this case the vehicle door 1), in such a way that the second part 311' passes through an area of the vehicle and shields the thrust element 32 from this area. As is illustrated in FIG. 13B, the second part 311' is arranged, in particular, on a vehicle door 1 in such a way that said second part 311' extends through a door breastwork 14 of the vehicle door 1 and, for this purpose, is guided through a guidance opening 141 in the door breastwork 14. The second part 311' therefore causes the thrust element 32 to be shielded against dirt and moisture with respect to an inside region of the door breastwork 14 which is arranged in the wet space NR of the vehicle door 1, permitting a sealed arrangement of the drive device 3 on the vehicle door 1. At the same time, the second part 311' causes the thrust element 32 to be guided in the region of the door breastwork 14 in that the second part 311' is securely connected to the door breastwork 14, and the thrust element 32 is guided in a sliding fashion in its interior.

As is illustrated in FIG. 13B, the other parts of the drive device 3 are generally arranged in the dry space TR of the vehicle door 1 and therefore do not need to be specially protected against moisture. As a result of the fact that the thrust element 32 and the transmission means 38 are virtually completely guided in the guide means 31, it is, however, also ensured that the drive device 3 is protected against dirt in the dry space TR of the vehicle door 1.

At the upper end of the thrust element 32, a connecting element 36 is formed which has a hook 361 by means of which the connecting element 36 can be connected to the transverse rod 21 of the roller blind 2. It is conceivable, for example, for the hook 361 to engage in an eyelet on the transverse rod 21 of the roller blind 2, in which case the connection of the hook 361 to the eyelet is made disconnectable and the roller blind 2 is engaged in the hook 361 in order to connect to the thrust element 32.

As illustrated in FIG. 13B, the roller blind 2 is arranged in a roller blind box 23 in the region of the door breastwork 14 of the vehicle door 1 and has a winding shaft 231 onto which the curtain 22 of the roller blind 2 is wound. For the purpose of activation, the thrust element 32 pulls the curtain 22 out of the roller blind box 23 into the region of the window opening 4 and thus unwinds the curtain 22 from the winding shaft 231.

As stated above, the variants of the drive device 3 according to FIGS. 2 to 13 use a drive 33 with a spindle 331 onto which the transmission means in the form of a cable is wound. An embodiment of the drive device which uses a drive 33 with a cable drum 39 instead of the spindle 331 will now be explained with reference to FIGS. 14 to 20.

The drive device 3 according to FIGS. 14 to 20 is intended in particular for use of a transmission means 38 in the form of a steel cable. A steel cable generally has a relatively large bending radius and therefore cannot be wound on in small turns. The drive device 3 according to FIGS. 14 to 20 therefore uses a cable drum 39 with a relatively large diameter, onto which cable drum the transmission means 38 in the form of the steel cable is wound.

The drive device 3 according to FIGS. 14 to 20 is of functionally analogous design to the drive device 3 according to FIGS. 2 to 13 and has, in particular, a drive 33, a guide means 31, a transmission means 38, a thrust element 32, a driver 37 for coupling the transmission means 38 to the thrust element 32 and a deflection means 34. Differences arise principally due to the use of the cable drum 39 in the drive 33.

The drive device 3 according to FIGS. 14 to 20 has a drive 33 with a motor 330 and a drive shaft 331" which is driven by the motor 330. The drive shaft 331" has, as is illustrated in particular in FIG. 16A, a worm toothing in the region of its outer circumferential face, which worm toothing engages with a toothing 392 on the circumference of the cable drum 39. The drive shaft 331" with its worm toothing and the cable drum 39 constitute a stepdown transmission by means of which a revolution of the drive shaft 331" is stepped down into a fraction of a revolution of the cable drum 39.

Figure 14A:
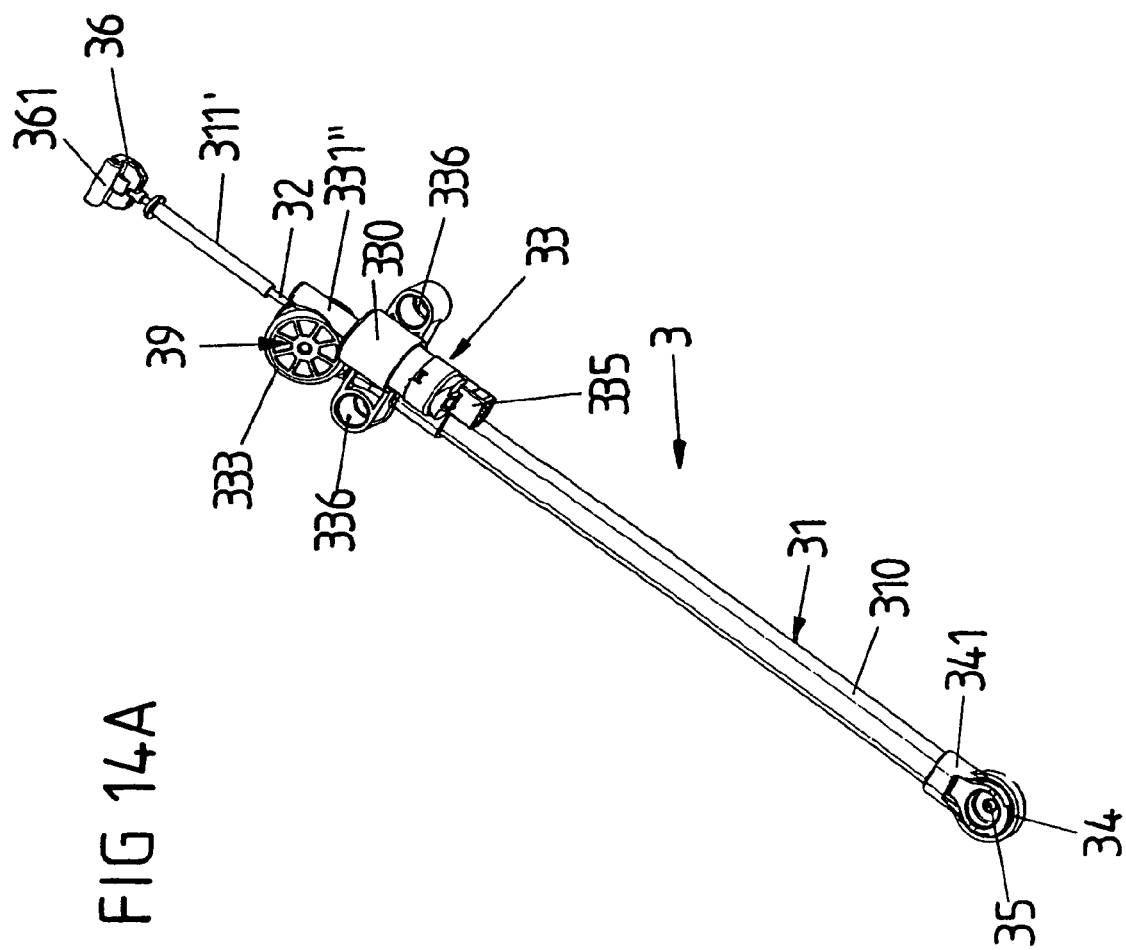
FIG. 14A shows a perspective view of an embodiment of a drive device with a drive which has a cable drum.

Different arrangements of the motor 330 relative to the cable drum 39 are conceivable. FIG. 14A illustrates, on the one hand, an arrangement in which the motor 330 extends, together with the drive shaft 331", parallel to the guide means 31, with the drive shaft 331" being in engagement with the cable drum 39. In contrast, FIGS. 14B and 14C illustrate a variant in which the motor 330 is arranged transversely with respect to the guide means 31, with the result that the drive shaft 331" extends from the motor 330 transversely with respect to the guide means 31 and is in engagement with the cable drum 39. Basically, the method of functioning of the drive 33 is independent of the arrangement and orientation of the motor 330.

The cable drum 39 is arranged so as to be rotatable about a rotational axis D on a housing base part 333 and is connected via the housing base part 333 to the motor 330. The cable drum 39 is enclosed in the manner of a housing by the housing base part and is rotatably mounted in the housing base part 333. As becomes clear in particular from the cross-sectional views according to FIGS. 15A and 15B, the cable drum 39 is arranged with its rotational axis D in an oblique position with respect to the direction of extent (parallel to the Z direction) of the guide means 31.

Figures 15A, 15B:
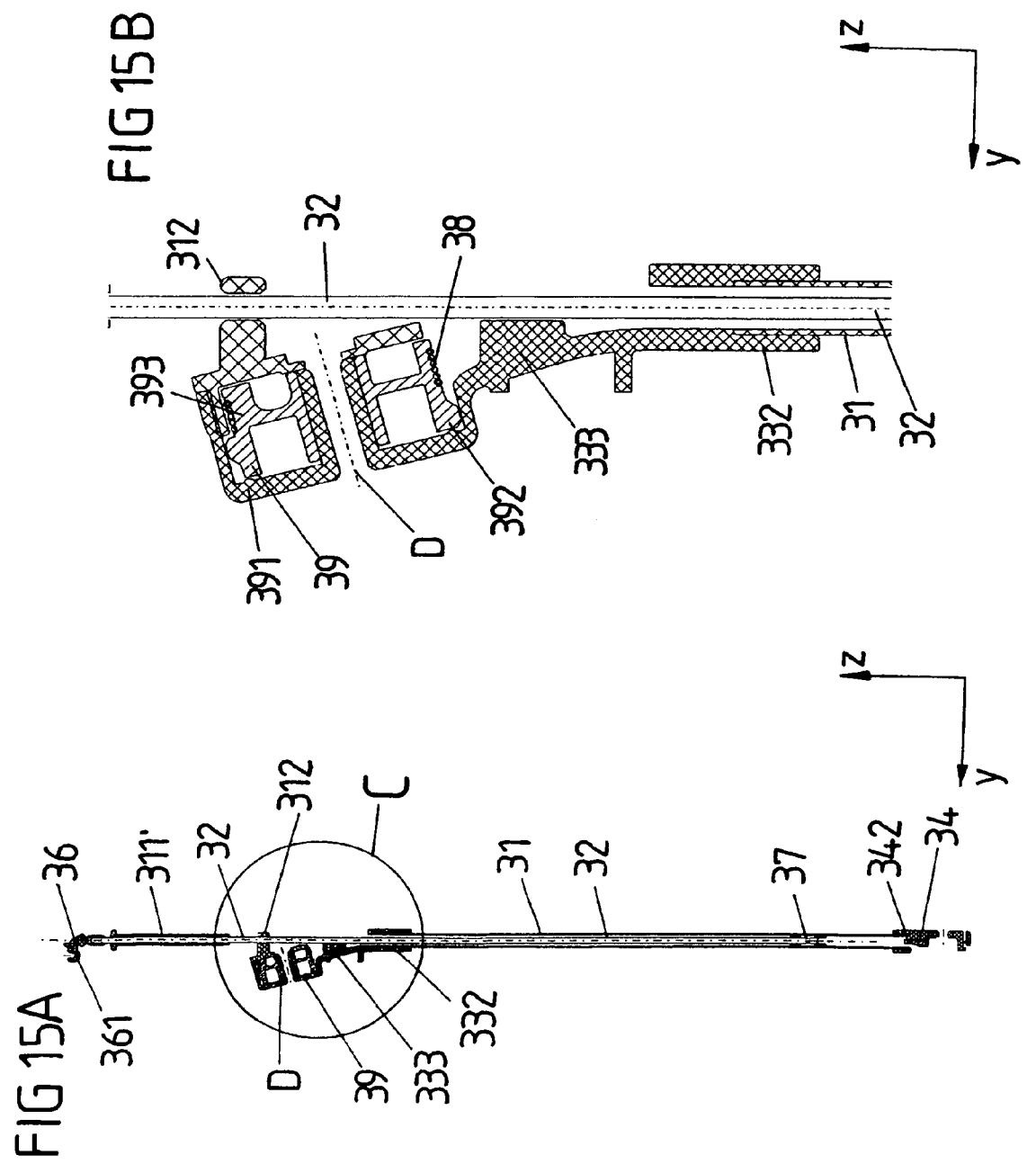

As is illustrated by viewing, for example, FIGS. 15A and 15B together with FIG. 18, the cable drum 39 is of essentially cylindrical design and has, on its circumferential face, both the toothing 392 and a winding region 393 which is designed to take up the transmission means 38 in an angular fashion. The transmission means 38 extends, as is illustrated for example in FIG. 16B, obliquely from the cable drum 39 into the guide means 31 and is guided in the guide means 31 to the deflection means 34 at the lower end of the guide means 31, and back from the deflection means 34 to the cable drum 39.

The oblique arrangement of the cable drum 39 has the effect that, on the one hand, the transmission means 38 in the form of the steel cable is inserted into the guide means 31 at an advantageous angle and, on the other hand, the toothing 392 of the cable drum 39 can be constructed with spur toothing for engagement with the drive shaft 331". In order to achieve the latter, the tilting angle of the cable drum 39 relative to the guide means 31 must respond to the angle of inclination of the worm toothing on the drive shaft 331", with the result that the (inclined) worm toothing of the drive shaft 331" can engage in the spur toothing 392 of the (inclined) cable drum 39.

FIG. 18 illustrates in detail the design of the cable drum 39. FIG. 18 also shows in particular that the toothing 392 of the cable drum 39 is of spur design and is in engagement with the inclined worm toothing of the drive shaft 331".

The cable drum 39 has two nipple chambers 386a, 386b, in each of which a cable nipple 383 and respectively 385 is arranged, said cable nipples 383 and 385 each being connected to an end 380a, 380b of the cable components 38a, 38b of the transmission nipple 38. The ends 380a, 380b of the cables are connected to the cable drum 39 via the cable nipples 383, 385 and the nipple chambers 386a, 386b, with the connection being produced in such a way that winding on one of the cable components 38a or 38b of the transmission means 38 causes the other cable component 38b or 38a to be unwound in such a way that the length of the transmission means 38 in the guide means 31 remains constant but the transmission means 38 moves in the guide means 31 and as a result drives the driver 37 which is connected to the transmission means 38.

The cable drum 39 provides a length compensation means 382 for compensating the length of the transmission means 38. The length compensation means 382 has a spring 384 which is arranged between the cable nipple 383 and that side of the nipple chamber 386a which faces the outlet point of the transmission means 38. The spring 384 causes the cable nipple 383 to be pretensioned in the nipple chamber 386a in such a way that when the tautening of the transmission means 38 is reduced, the cable nipple 383 is displaced in the nipple chamber 386a in order to re-tension the transmission means 38.

In a way which is analogous to the embodiment of the drive device according to FIGS. 2 to 13, in the embodiment according to FIGS. 14 to 20 the thrust element 32 is also connected via a driver 37 to the transmission means 38. The driver 37, which corresponds in its functional embodiment to the driver 37 of the embodiment according to FIGS. 2 to 13, is illustrated in detail in FIGS. 19, 20A and 20B. The driver 37 is coupled to the cable component 38a of the transmission means 38 via a cable nipple 381 which is arranged in a nipple chamber 377 of the driver 37 and is securely connected to the transmission means 38. A movement of the transmission means 38 is therefore transferred directly into a movement of the driver 37. The second cable component 38b of the transmission means 38 is guided here in a sliding fashion in a sliding opening 376 of the driver 37.

The driver 37 is disconnectably connected to the thrust element 32. For this purpose, the driver 37 has elastic ribs 374 which, when the thrust element 32 is plugged in, are in engagement with a notch 322 in the region of the lower end of the thrust element 32 and therefore hold the thrust element 32 in the driver 37. The elastic ribs 374 are, as illustrated in FIG. 20A, of web-like design and are connected integrally to the base body of the driver 37 which is formed from plastic. Spring-elastic elements 375 are arranged between the elastic ribs 374 in slits which run parallel to the direction of extent of the thrust element 32, said spring-elastic elements 375 pre-tensioning the elastic ribs 374 elastically with respect to the thrust element 32 and being embodied, for example, in the form of bead-like rubber stoppers. The elongate configuration of the spring-elastic elements 375 is clear in particular in the cross-sectional illustration according to FIG. 20B, which shows the driver 37 in cross part along the sectional line IV-IV according to FIG. 20A.

In a way which is analogous to the embodiment of the driver 37 according to FIG. 4B, in the case of the driver 37 according to FIGS. 19 and 20A, 20B the thrust element 32 is also disconnectably connected to the driver 37 and can, on the one hand, be disconnected from the driver 37 by applying a tractive force in the closing direction ZU or by applying a compressive force in the opening direction AUF to the thrust element 32. As a result of the fact that in the case of a compressive force the thrust element 32 can be forced through the driver 37 in order thus to disconnect the connection between the thrust element 32 and the driver 37, a case of trapping is prevented by virtue of the fact that the elastic ribs 374 and the spring-elastic elements 375 are configured in such a way that when a specific compressive force is exceeded the connection between the thrust element and the driver 37 is automatically disconnected and the thrust element 32 and the driver 37 disengage. In its method of functioning, the driver 37 according to FIGS. 19 and 20A, 20B is embodied in an analogous way to the driver 37 according to FIG. 4B.

The housing base part 333 of the drive 33 is securely connected to the first part 310 of the guide means 31, in which case the first part 310 is plugged into the housing base part 333 in order to connect the guide means 31 to the drive 33, as is illustrated in FIG. 15B.

A guide bushing 312 (see FIGS. 15A and 15B) is arranged on the housing base part 333 and defines a guidance point of the thrust element 32 in the region of the drive 33. A second part 311' of the guide means 31 is arranged on the thrust element 32 and, analogously to the embodiment according to FIGS. 11 to 13, is embodied separately from the first part 310 of the guide means 31. The second part 311' serves, on the one hand, to seal and to protect the thrust element 32 and, on the other hand, to attach the thrust element 32 to the vehicle in a guiding fashion, as has been explained with reference to FIGS. 13A and 13B.

The embodiments of the drive device 3 according to FIGS. 1 to 20 refer to a drive device 3 for moving a covering element in the form of the roller blind 2 which is arranged as a separate unit on a vehicle door 1, for example on a door inside panel 12 of the vehicle door 1. Different methods of attaching the drive device 3 to the vehicle door 1 are conceivable here.

Firstly, it is conceivable for the drive device 3 to be arranged on a door inside panel 12 or a door module carrier panel in order to activate a roller blind 2 (see FIG. 13B) which is wound onto a winding shaft 231, in which case the winding shaft 231 is mounted in a roller blind box 23 which is arranged on a door inside trim.

Secondly, it is conceivable for both the drive device 3 and the roller blind box to be arranged on the door inside trim.

Thirdly, it is conceivable for both the drive device 3 and the roller blind box 23 to be arranged on the door inside panel 12 or on a door module carrier panel.

In a fourth variant it is also possible for the drive device 3 to be provided on the door inside trim 16 but for the roller blind box 23 to be provided on the door inside panel 12 or on a door module carrier panel.

An advantage of the drive device 3 according to the embodiments in FIGS. 1 to 20 is that the drive device 3 constitutes a compact unit which can be pre-tested completely before mounting. As a result of the integration of the transmission means 38 and of the thrust element 32 into the guide means 31, the components of the drive device 3 are arranged in a compact way and at the same time protected against dirt and moisture from external effects.

As an alternative to embodying the drive device 3 as a separate unit it is also conceivable to integrate the drive device 3 into a vehicle door 1, in particular a door module carrier panel. Such an embodiment of the drive device 3 in which the drive device 3 is integrated into a door module carrier panel 15 of a vehicle door 1 is illustrated in FIGS. 21 to 27. The integration of the drive device 3 into the door module carrier panel 15 is achieved here in particular by virtue of the fact that the guide means 31 of the drive device 3 is formed integrally in the door module carrier panel 15 which is manufactured, for example, from plastic.

Figure 21:
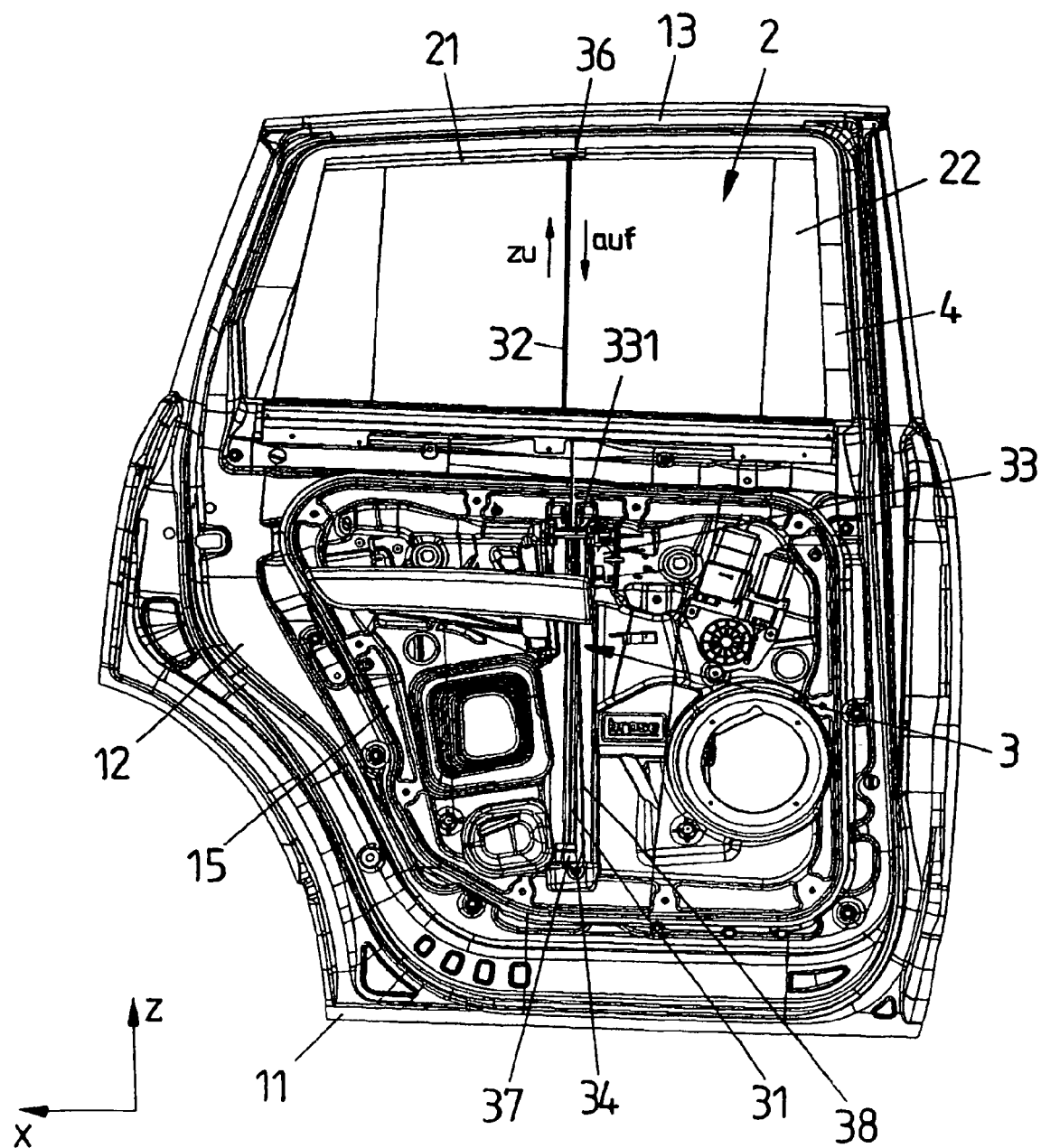
FIG. 21 shows a front view of a drive device, integrated into a door module carrier panel, for a roller blind of a vehicle door.

The door module carrier panel 15 is part of a door module and is fitted with different assemblies of the vehicle door 1, for example a loudspeaker, an armrest, a window lifter or the like, said assemblies not being denoted in more detail in FIG. 21.

As is illustrated in FIG. 21, the guide means 31 extends in the Z direction vertically along the door module carrier panel 15. At the upper end of the guide means 31, a drive 33 is arranged, and at the lower end of the guide means 31a deflection means 34 is arranged. A driver 37, which is coupled to a transmission means 38 which extends at least in certain sections in the guide means 31 and is moved in the guide means 31 by moving the transmission means 38, is guided in the guide means 31.

In the embodiment illustrated in FIGS. 21 to 27, a drive 33 with a spindle 331 is used to wind on and unwind the transmission means 38. The drive device 3 is in terms of its function completely analogous here to the embodiment of the drive device 3 according to FIGS. 2 to 13. In particular, the transmission means 38 is connected by both of its ends to the spindle 331 in such a way that, in the manner of a single-strand cable window lifter, winding on over one end of the transmission means 38 brings about unwinding of the other end, and vice versa, so that a rotational movement of the spindle 331 is transferred into a longitudinal movement of the transmission means 38 in the guide means 31, and therefore into a longitudinal movement of the driver 37 in the guide means 31.

Basically, it is of course also possible for a drive device 3 with a drive 33 which has a cable drum 39 to be integrated into the door module carrier panel 15, which is analogous to the embodiment according to FIGS. 14 to 20.

Figure 22:
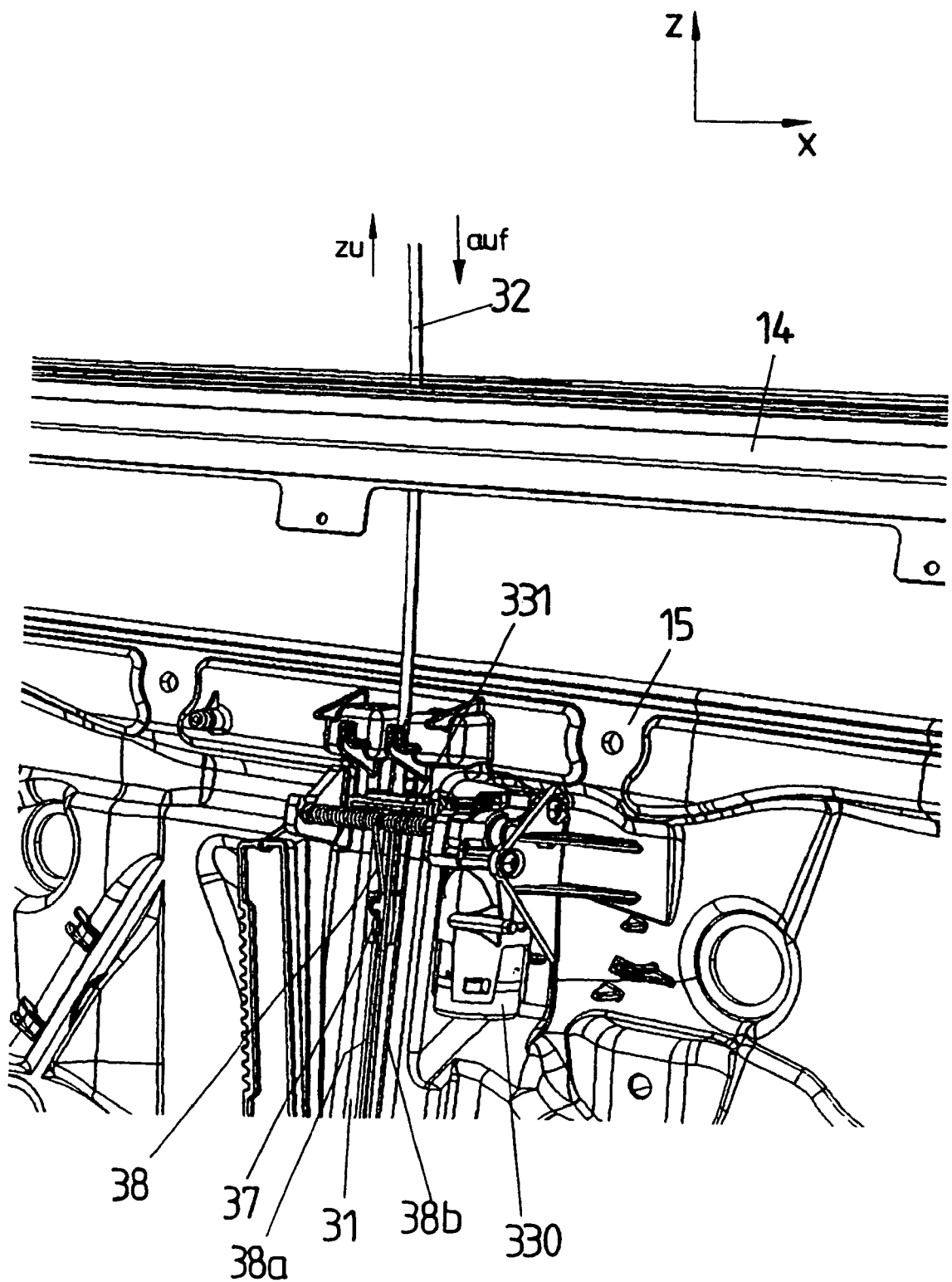
FIG. 22 shows a perspective partial view of the drive device, which is integrated into a door module carrier panel, according to FIG. 21.
Figure 25:
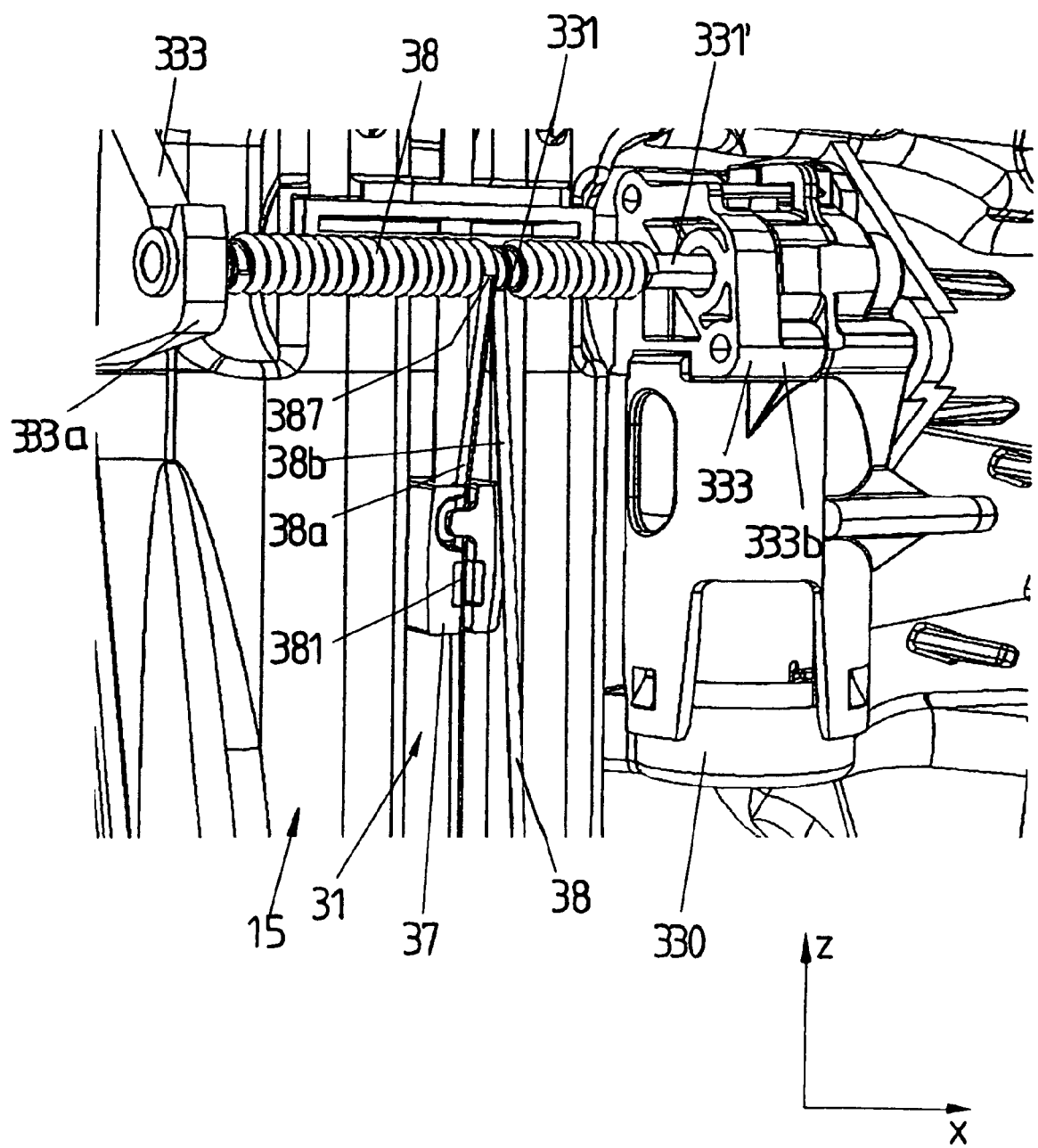
FIG. 25 shows a perspective detail view of the spindle of the drive device on the door module carrier panel of the vehicle door according to FIG. 21.

As is illustrated in FIGS. 22 and 25, the spindle 331 of the drive 33 is rotatably mounted in a housing base part 333 which is integrally connected to the door module carrier panel 15. The spindle 331 extends between projections 333a, 333b of the housing base part 333, is connected to the motor 330 of the drive 33 via a drive shaft 331' and is driven via the latter.

Figure 26:
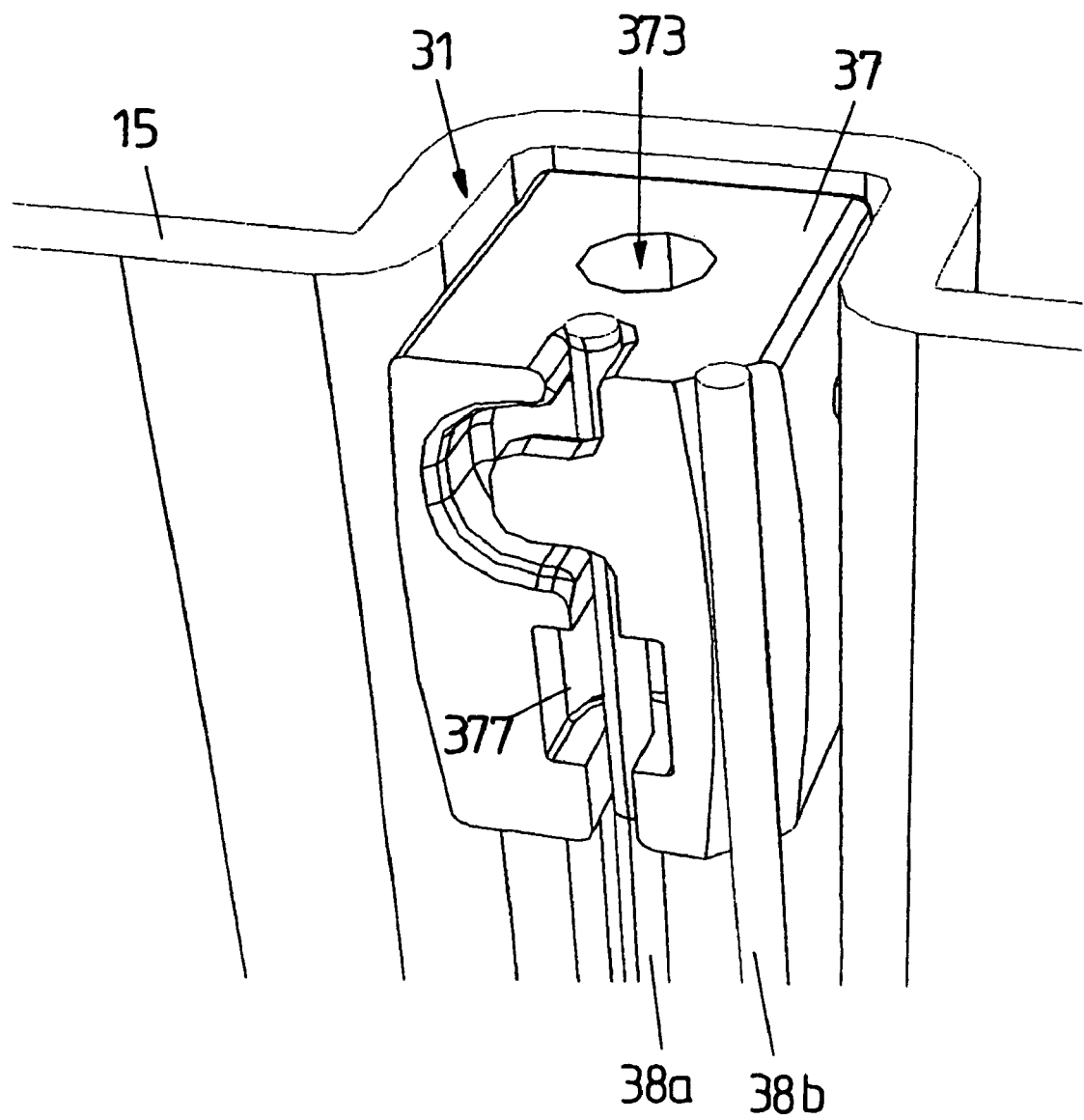
FIG. 26 is a perspective partially sectional view of the driver in the guide means on the door module carrier panel according to FIG. 25.

The guide means 31 is embodied in the form of a guide duct which, as is illustrated in particular in FIG. 26, has a U-shaped profile in cross part perpendicular to the direction Z of its extent. The driver 37 is therefore supported on both sides in a first direction which corresponds to the X direction, but in a second direction, corresponding to the Y direction, it is supported on only one side.

In order to ensure that the driver 37 is guided securely in the guide means 31, lateral guide ribs (not illustrated in FIG. 26) which extend along the guide means 31 can be formed in the region of the guide means 31, which guide ribs engage in a groove on the driver 37 in order to guide the driver 37 in the guide means 31, and bring about guidance of the driver 37 along the guide means 31.

Alternatively or additionally, the driver 37 is advantageously held in the Y direction in the guide duct 31 by virtue of the fact that the thrust element 32 which is connected to the driver 37 and which is embodied, for example, as an elastic rod element is pretensioned relative to the guide duct 31. How this is achieved in particular is apparent from FIGS. 23 and 24 and will be explained below.

Figure 23:
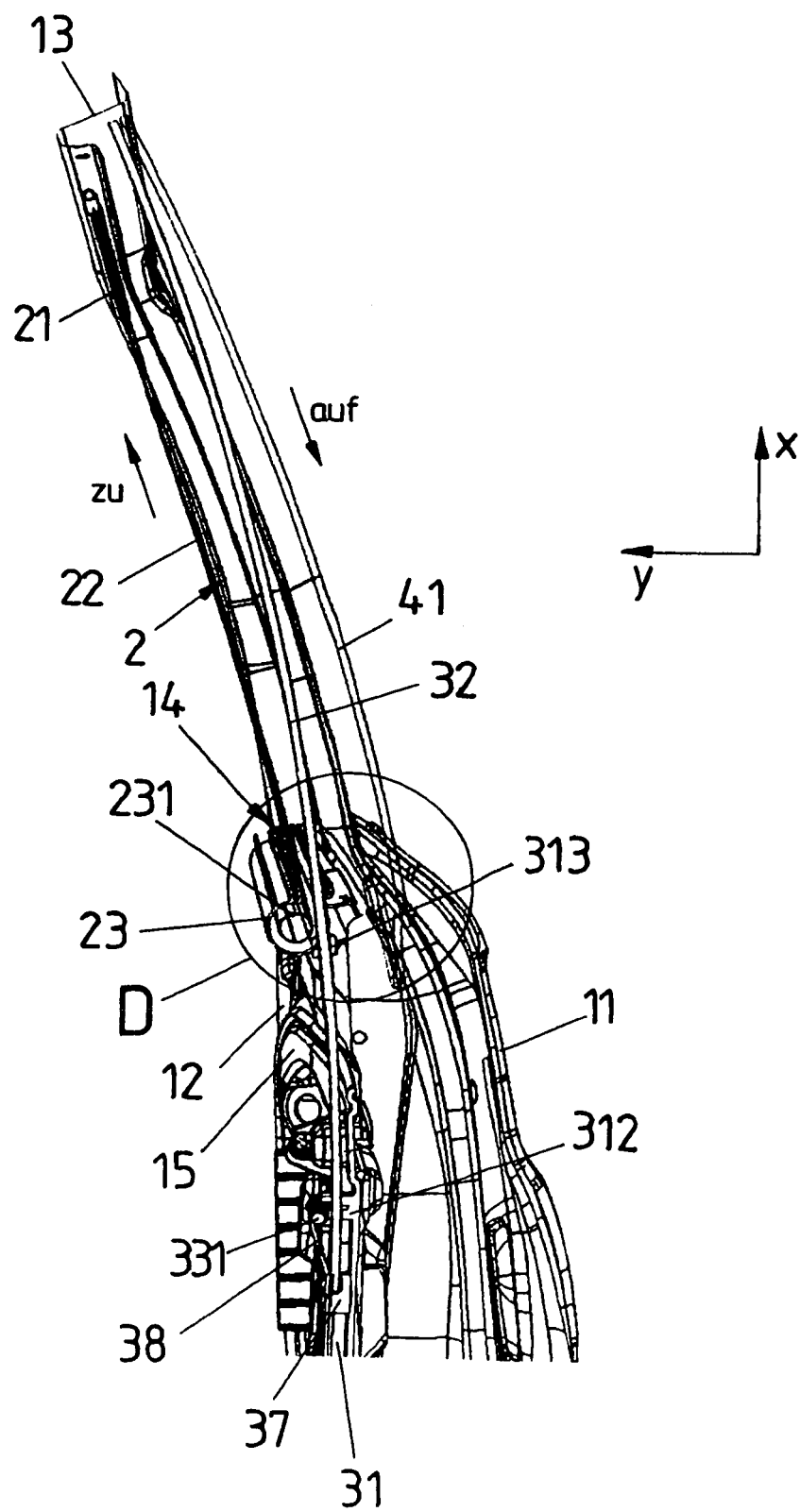
FIG. 23 shows a side view of the upper region of the drive device, which is integrated into a door module carrier panel, according to FIG. 21.
Figure 24:
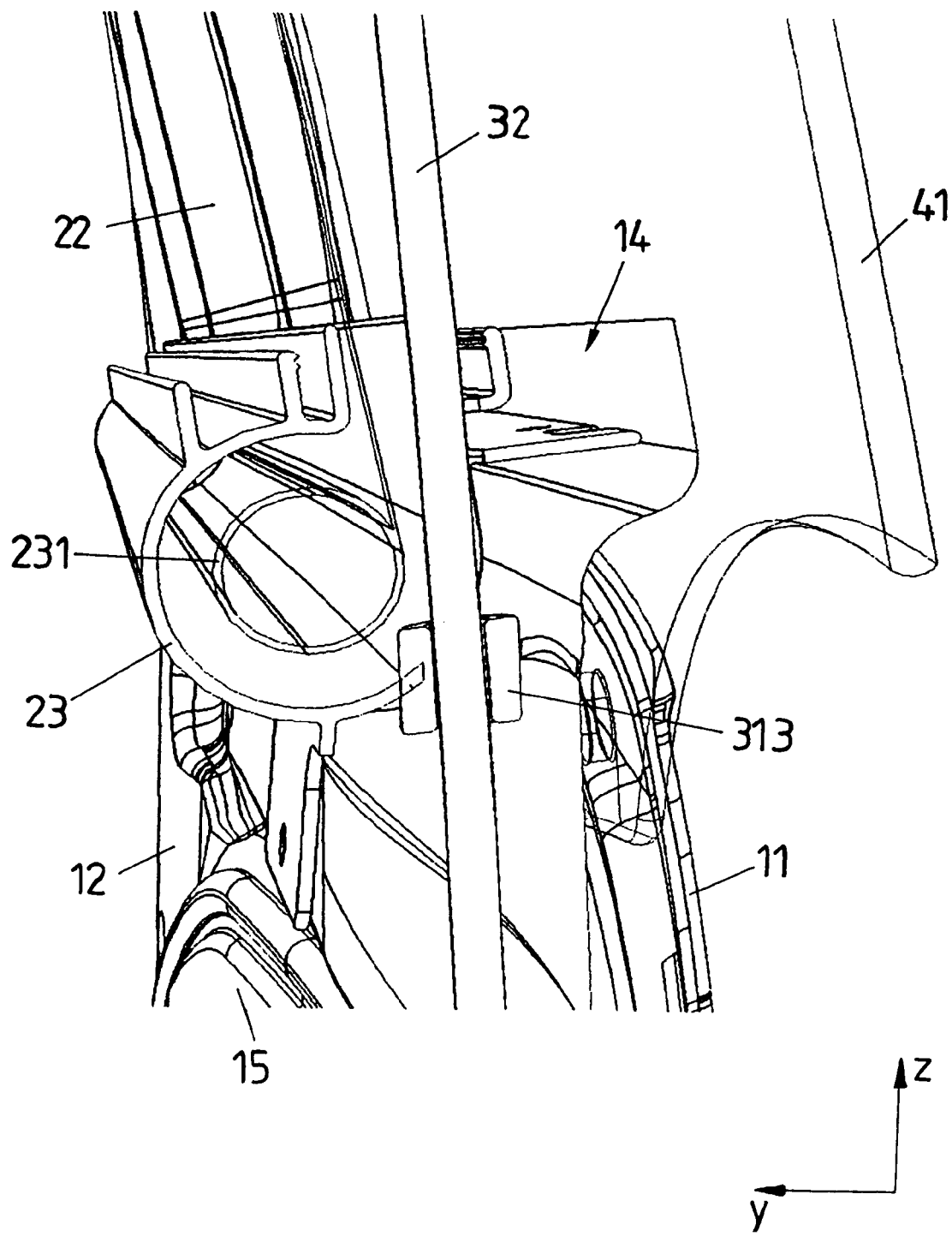
FIG. 24 shows an enlarged detail of the region D of the view according to FIG. 23.

The thrust element 32, which is connected at its lower end to the driver 37 and is guided in the guide means 31 in the form of the guide duct, is additionally guided by a guide bushing 312 in the region of the drive 33 (see FIG. 23) and a guide bushing 313 in the region of the door breastwork 14 (see FIGS. 23 and 24). The guide bushings 312, 313 are arranged outside the virtual prolongation of the guide means 31 in the Z direction and as a result cause the driver 37 to be pressed into the guide means 31 which is embodied as a guide duct, and it therefore cannot slide out of the guide duct which is open on one side.

Additional tensioning of the thrust element 32 is achieved by virtue of the fact that the upper end of the thrust element 32, on which the connecting element 36 for connecting the thrust element 32 to the covering element in the form of the roller blind 2 is arranged, slides, in the case of a closing movement, along the window pane 41 which closes the window opening 4.

Since the window pane 41 is generally of slightly curved design in the transverse direction, corresponding to the Y direction, the movement of the thrust element 32 brings about, in the closing direction ZU, curvature of the tractive element 32 in the transverse direction Y and therefore increasing tensioning of the thrust element 32 compared to the guide means 31. This additionally ensures that the driver 37 is reliably guided in the guide duct which is open on one side and forms the guide means 31.

As a result of the pretensioning of the thrust element 32 with respect to the guide means 31 it is possible to achieve a further advantageous effect. In particular, the pretensioning by means of the guide bushings 312, 313 in a lower travel region in which the thrust element 32 has essentially moved into the guide means 31 is advantageously to be made large, but in an upper travel region in which the thrust element 32 has essentially moved out of the guide element 31 it is advantageously to be made small. As a result, difficulties of movement and ease of movement are compensated over the travel range of the drive device 3, with the result that the movement force which is applied to the thrust element 32 by the drive 33 is approximately the same over the entire travel range of the thrust element 32. In particular, the drive device 3 has pretensioning applied to it in this way in a lower travel region in which the displacement operation generally involves easy movement, and the movement force is therefore throttled. At the same time, in an upper travel region in which the drive device 3 generally moves with more difficulty, only a slight degree of tensioning is applied, with the result that the movement force in this travel range is only slightly throttled, or is not throttled at all. This ensures that a vehicle occupant who activates the drive device 3 senses the travel operation as pleasant, and difficulties of movement of the drive device 3 in the upper travel region cannot be perceived by the vehicle occupant.

Providing such pretensioning which is dependent on the travel range is advantageous in particular in order to set a constant adjustment speed when the motor 330 of the drive 33 does not have rotational speed control.

FIG. 25 illustrates that if the driver 37 is in an upper position in the direct vicinity of the spindle 331 of the drive 33, the cable component 38a, extending from the spindle 331 to the driver 37, of the transmission means 38 runs between the driver 37 and the spindle 331 in such a way that the attachment point 387 of the cable component 38a to the spindle 331 is arranged immediately above the guide means 31. In this way, as has already been explained above with reference to FIGS. 5A and 10, longitudinal forces which are directed essentially in the direction of extent of the guide means 31 in the upper position of the driver 37 are applied to the driver 37 but transverse forces are prevented from being applied.

In the embodiment of the driver 37 which is illustrated in detail in FIG. 26, the transmission means 38 is coupled in the region of its cable component 38a by means of a cable nipple (not illustrated in FIG. 26) which is connected to the cable component 38a and is arranged in the nipple chamber 377 of the driver 37. The cable component 38b, which extends back to the drive 33 from the deflection means 34, is guided in a sliding fashion past the driver 37. The thrust element 32 is inserted into the driver 37 through an opening 373 in the upper region of the driver 37 and is disconnectably connected to the driver 37.

Figure 27:
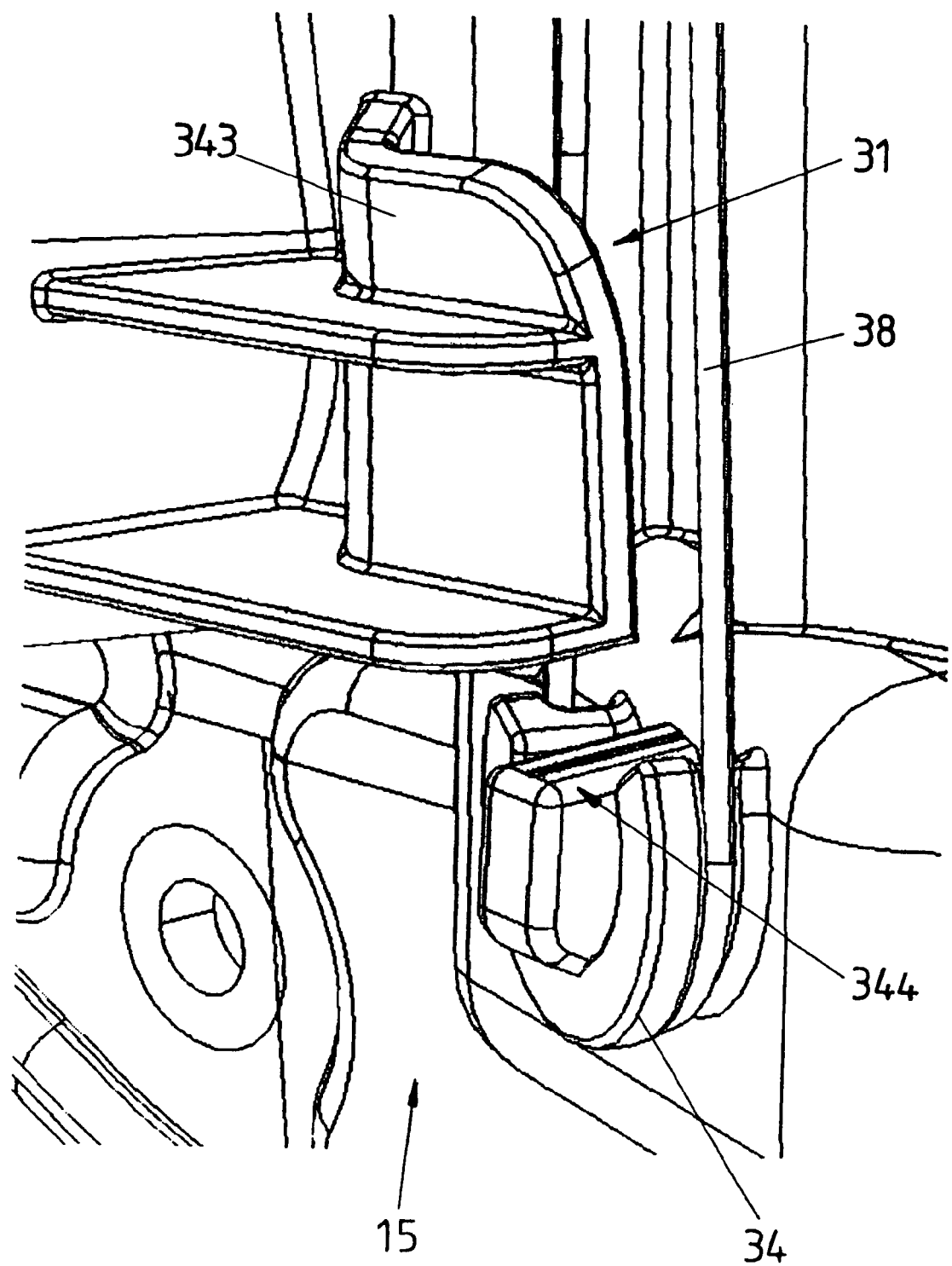
FIG. 27 shows a perspective detail view of a locking means in the lower region of the drive device on the door module carrier panel.

The region of the lower deflection means 34 of the drive device 3 is illustrated in detail in FIG. 27. The deflection means 34 is formed integrally onto the door module carrier panel 15 and serves to deflect the transmission means 38 through 1800. The displacement travel of the driver 37 in the guide means 31 is limited by a stop 344 in the region of the deflection means 34 at the lower end of the guide means 31. In this lower home position of the driver 37, the driver 37 bears against the stop 344 and is simultaneously secured by a locking means in the form of a run-in element 343 in the guide means 31, in particular transversely with respect to the guide means 31. The run-in element 343 has a run-in slope on its upper edge and is designed to take up the driver 37 which slides from above along the guide means 31 in the direction of the deflection means 34, and to secure the driver 37 in the guide means 31, in the lower position of said driver 37 in the region of the deflection means 34.

As an alternative to the run-in element 343 according to FIG. 27, a bolt 342 can also be used according to FIG. 9B.

Movement of the covering element in the form of the roller blind 2 is preferably controlled in such a way that the roller blind 2 can be deployed into its closed, covering position only if the window pane 41 of the vehicle door 1 is closed and therefore covers the window opening 4 in the vehicle door 1. It is then not possible for the roller blind 2 to move when the window pane 41 is opened. A control device which interacts simultaneously with a window lifter in order to activate the window pane 41 and the drive device 3 in order to activate the roller blind 2 is preferably configured for this purpose in such a way that if an opening operation of the window pane 41 is initiated, the roller blind 2 is initially retracted and therefore opened, in order subsequently to open the window pane 41. Conversely, if the window pane 41 is opened, a closing instruction for the roller blind 2 takes place, and the window pane 41 is firstly closed in order subsequently to deploy the roller blind 2.

The roller blind 2 is preferably operated in an automatic sequence by the roller blind 2 being moved automatically from the completely opened position into the completely closed, covering position when a closing instruction is issued. Conversely, when an opening instruction is issued the roller blind 2 is completely retracted automatically.

The thrust element 32 which is coupled to the roller blind 2 is preferably moved in such a way that during a closing operation it comes to bear against the closed window pane 41 and moves along the closed window pane 41 into the closed position. The drive device 3 is advantageously designed in such a way in this context that the thrust element 32 comes to bear against the window pane 41 as quickly as possible during the closing process via a bearing element which is formed in the region of the connecting element 36, and said thrust element 32 is therefore guided on its displacement path in a sliding fashion by the window pane 41.

Figure 29:
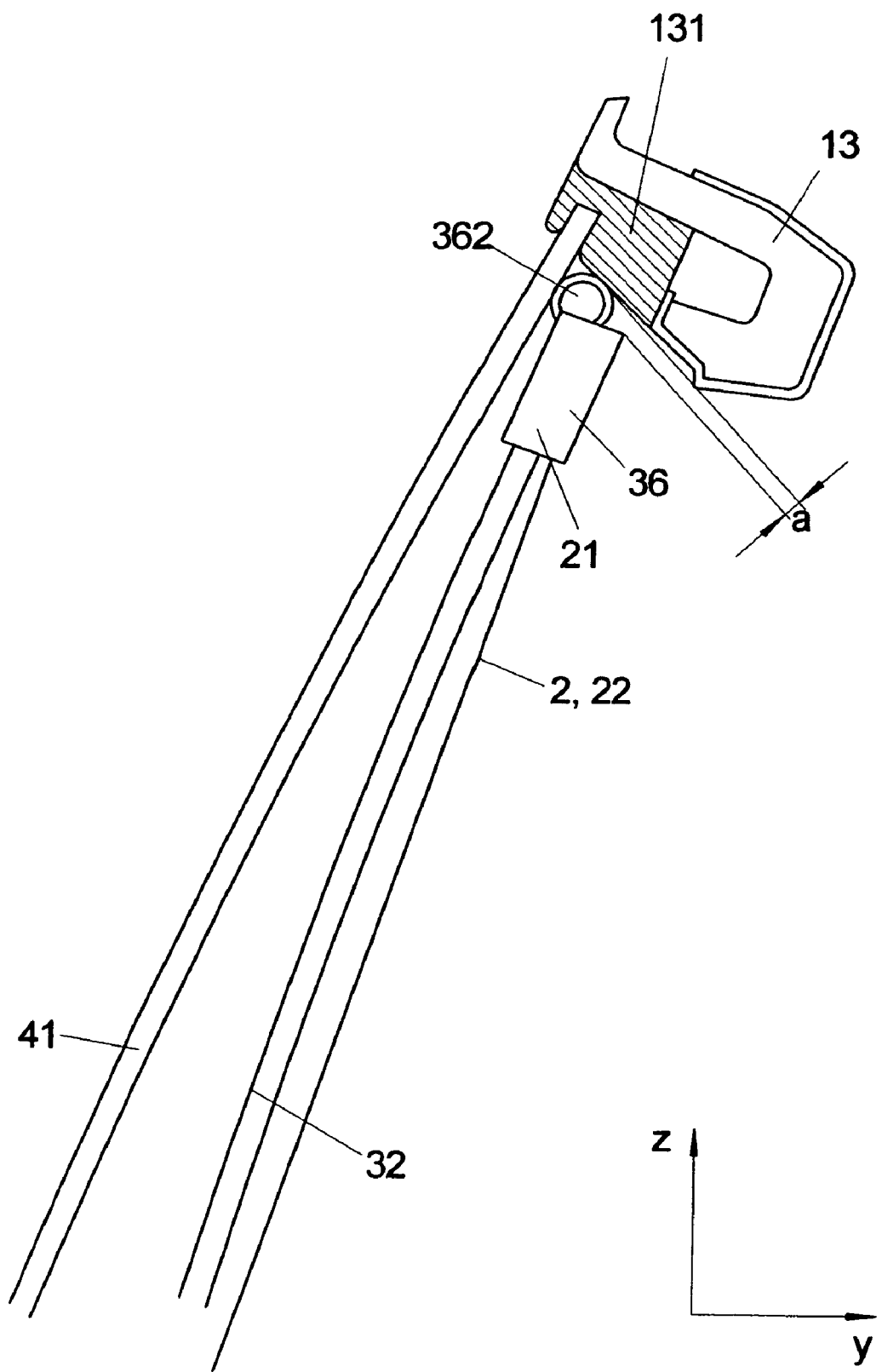
FIG. 29 shows a schematic side view of a roller blind on a vehicle door in the extended state.

Embodiments of such a bearing element 362 are illustrated in FIGS. 28A and 28B as well as in FIG. 29. The bearing element 362 is formed on the connecting element 36 at the upper end of the thrust element 32 and constitutes a spacer element which prevents the connecting element 36 from being able to bear against the window pane 41 during the displacement travel of the thrust element 32, and ensures that in the closed position the connecting element 36 is spaced apart at a distance a from an upper transverse frame element of the window frame 13, in particular a seal 131. The bearing element 362 can be adapted in terms of its material in such a way that it slides easily along the window pane 41.

As illustrated in the exploded view in FIG. 10, the bearing element 362 is advantageously arranged on the connecting element 36 so as to be capable of rotating about an axis 363, and it can therefore be moved without friction along the window pane 41.

As is illustrated in FIG. 28B, additional bearing elements 362', 362" are formed on the upper transverse rod 21 of the roller blind 2 and they ensure secure, defined guidance of the transverse rod 21 along the window pane 41.

In the embodiment according to FIG. 28A, the bearing element 362 is manufactured in a solid way, for example from plastic. FIG. 29 illustrates an alternative embodiment of the bearing element 362 in which the bearing element 362 is of elastic design and can be deformed in order to compensate and adapt the sliding movement and can come to bear in a positively locking fashion against the window pane 41 during the displacement movement.

The idea underlying the invention is not restricted to the exemplary embodiments described above. In particular, the use of the drive device 3 is not restricted to the activation of a roller blind 2 of a vehicle door 1. Instead, a drive device of the same type can also be used to move a sunroof cover or a baggage space cover. In FIG. 2, a roller blind, a sunroof cover, and/or a baggage space cover are represented diagrammatically by block 2A.

The invention claimed is:

1. A drive device for moving a covering element for covering an opening in a motor vehicle, the cover element being one of a roller blind, a baggage space cover or a sunroof cover, the drive device comprising:
   a drive;
   a guide device;
   a thrust element coupled to the drive, the thrust element guided in the guide device and connectable to the covering element in order to move the covering element;
   wherein the drive is coupled to the thrust element via a transmission device constituted as a flexible cable for transmitting traction forces, wherein the transmission device extends at least sectionally in the guide device and is constituted to move the thrust element in the guide device, by transmitting traction forces to the thrust element, in a closing direction so as to move the covering element to close the opening, or in an opening direction so as to move the covering element to clear the opening.

2. The drive device of claim 1, wherein the thrust element comprises a rod extending essentially parallel to the opening direction and the closing direction.

3. The drive device of claim 1, wherein the drive is configured to be arranged on a vehicle door in order to move a roller blind in such a way that the guide device extends essentially in an internal space in the vehicle door and is configured to guide the thrust element into a region of the window opening in the vehicle door.

4. The drive device of claim 1, wherein the guide device comprises a guide duct or guide pipe which extends in a direction of extent, the direction of extent being essentially parallel to an opening direction and a closing direction, and wherein the thrust element comprises a rod guided in the guide device, the guide device supporting the thrust element transversely with respect to the direction of extent.

5. The drive device of claim 1, wherein the guide device is integrated into a door module carrier panel or a door inside trim of a vehicle door.

6. The drive device of claim 1, wherein the thrust element is connected to the transmission device via a driver, the thrust element being guided in a first part of the guide device via the driver.

7. A drive device for moving a covering element for covering an opening in a motor vehicle, the cover element being one of a roller blind, a baggage space cover or a sunroof cover, the drive device comprising:
   a drive;
   a guide device;
   a thrust element coupled to the drive, the thrust element guided in the guide device and connectable to the covering element in order to move the covering element;
   wherein the drive is coupled to the thrust element via a transmission device constituted as a flexible cable for transmitting traction forces, wherein the transmission device extends at least sectionally in the guide device and is constituted to move the thrust element in the guide device, by transmitting traction forces to the thrust element, in a closing direction so as to move the covering element to close the opening, or in an opening direction so as to move the covering element to clear the opening,
   wherein the thrust element is connected to the transmission device via a driver, the thrust element being guided in a first part of the guide device via the driver, and
   wherein the guide device extends in a direction of extent being essentially parallel to the opening direction and the closing direction, and wherein the driver is guided in the guide device in a damped fashion by an elastic element acting, in a transverse direction with respect to the direction of extent of the guide device, between the driver and the guide device.

8. A drive device for moving a covering element for covering an opening in a motor vehicle, the cover element being one of a roller blind, a baggage space cover or a sunroof cover, the drive device comprising:
   a drive;
   a guide device;
   a thrust element coupled to the drive, the thrust element guided in the guide device and connectable to the covering element in order to move the covering element;

wherein the drive is coupled to the thrust element via a transmission device constituted as a flexible cable for transmitting traction forces, wherein the transmission device extends at least sectionally in the guide device and is constituted to move the thrust element in the guide device, by transmitting traction forces to the thrust element, in a closing direction so as to move the covering element to close the opening, or in an opening direction so as to move the covering element to clear the opening, wherein the thrust element is connected to the transmission device via a driver, the thrust element being guided in a first part of the guide device via the driver, and wherein the first part of the guide device is connected at one end of the first part to the drive, and at the other end of the first part to a deflection device for deflecting the transmission device, the deflection device being connected in a spring-elastic fashion to the first part of the guide device in order to compensate for lengths of the transmission device in a direction of extent of the guide device.

9. The drive device of claim 6, wherein the transmission device extends from the drive into the guide device through a cutout in the guide device, and is guided in a lower part of the guide device.

10. The drive device of claim 6, wherein in at least one of a home position and an end position, the driver is in contact with a stop on the guide device, wherein in at least one of the home position and in the end position the driver is secured transversely with respect to a direction of extent of the guide device by a locking device.

11. The drive device of claim 1, wherein the thrust element is detachably connected to the transmission device, the thrust element being connected, via a connecting device which is dependent on compressive force, to a driver which is guided in the guide device and coupled to the transmission device.

12. The drive device of claim 11, wherein the connecting device is configured in such a way that when there is a compressive force acting in the opening direction due to a case of trapping, the thrust element becomes detached from the driver, with the result that the covering element which is coupled to the thrust element is moveable back in order to clear the opening in the vehicle.

13. The drive device of claim 11, wherein the connecting device is configured to bring about the connection between the driver and the thrust element when the driver which is coupled to the transmission device moves into a home position.

14. The drive device of claim 1, wherein the guide device has a first part and a second part, wherein the second part of the guide device is adapted in terms of its shape to guide the thrust element, the guide device having, in its second part, integral constrictions in which the thrust element is guided.

15. The drive device of claim 1, wherein the drive has a winding device being rotatable about a rotational axis and having the form of a spindle or a cable drum which is configured to take up the transmission device, wherein a rotational movement of the winding device about the rotational axis allows the transmission device for driving the thrust element to be wound onto or unwound from the winding device.

16. A drive device for moving a covering element for covering an opening in a motor vehicle, the cover element being one of a roller blind, a baggage space cover or a sunroof cover, the drive device comprising:

a drive;
a guide device;
a thrust element coupled to the drive, the thrust element guided in the guide device and connectable to the covering element in order to move the covering element;
wherein the drive is coupled to the thrust element via a transmission device constituted as a flexible cable for transmitting traction forces, wherein the transmission device extends at least sectionally in the guide device and is constituted to move the thrust element in the guide device, by transmitting traction forces to the thrust element, in a closing direction so as to move the covering element to close the opening, or in an opening direction so as to move the covering element to clear the opening,
wherein the drive has a winding device being rotatable about a rotational axis and having the form of a spindle or a cable drum which is configured to take up the transmission device, wherein a rotational movement of the winding device about the rotational axis allows the transmission device for driving the thrust element to be wound onto or unwound from the winding device, and
wherein the transmission device which is configured as the flexible cable has two ends which are connected to the winding device in such a way that a rotation of the winding device in one rotational direction causes the first end to be wound on the winding device, and a rotation of the winding device in the other rotational direction causes the second end to be wound on the winding device, wherein the thrust element coupled to the transmission device is moveable in the opening direction or in the closing direction as a function of a direction of rotation of the winding device.

17. A method for mounting an adjustment system for covering an opening in a motor vehicle, the adjustment system being one of a roller blind, a baggage space cover or a sunroof cover, wherein the adjustment system comprises:

a planar covering element for covering the opening in the motor vehicle;
a drive device having a drive, a guide device, a transmission device, and a driver guided along a longitudinal direction in the guide device and driven, via the transmission device, by the drive; and
a longitudinally extended thrust element configured to be coupled to the drive and connected in a mounted state at a first end to the driver and at a second end to the covering element in order to move the covering element;
wherein, the method of mounting comprises:
arranging the covering element and the drive device on the motor vehicle or a vehicle component;
inserting the thrust element along the longitudinal direction into the guide device after arranging the cover element and the drive device; and
connecting a first end of the thrust element to the driver so as to connect the thrust element via the driver to the transmission device, and connecting a second end of the thrust element to the covering element.

18. The method of claim 17, wherein in a transportation position in which the adjustment system is delivered, the thrust element is plugged into the guide device, and for the purpose of mounting, the thrust element is then firstly taken out of the guide device, and after the guide device has been attached, the thrust element is then inserted into the guide device.

* * * * *